Oct. 26, 1937.  W. K. HOWE  2,096,936

AUTOMATIC TRAIN CONTROL SYSTEM

Filed April 3, 1919   7 Sheets-Sheet 1

INVENTOR
Winthrop K. Howe,
BY Neil D. Preston
ATTORNEY

Oct. 26, 1937.  W. K. HOWE  2,096,936
AUTOMATIC TRAIN CONTROL SYSTEM
Filed April 3, 1919  7 Sheets-Sheet 2

INVENTOR
Winthrop K. Howe,
BY
Neil D. Preston
ATTORNEY

Oct. 26, 1937.  W. K. HOWE  2,096,936
AUTOMATIC TRAIN CONTROL SYSTEM
Filed April 3, 1919   7 Sheets-Sheet 3

INVENTOR
Winthrop K. Howe,
BY
Neil D. Preston
ATTORNEY

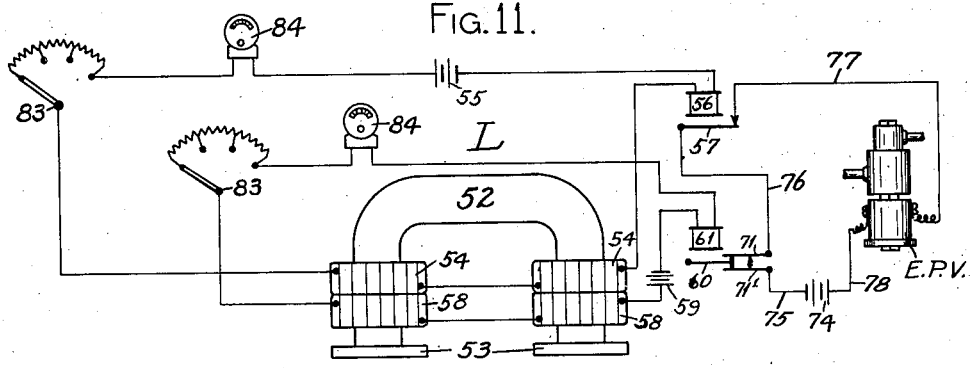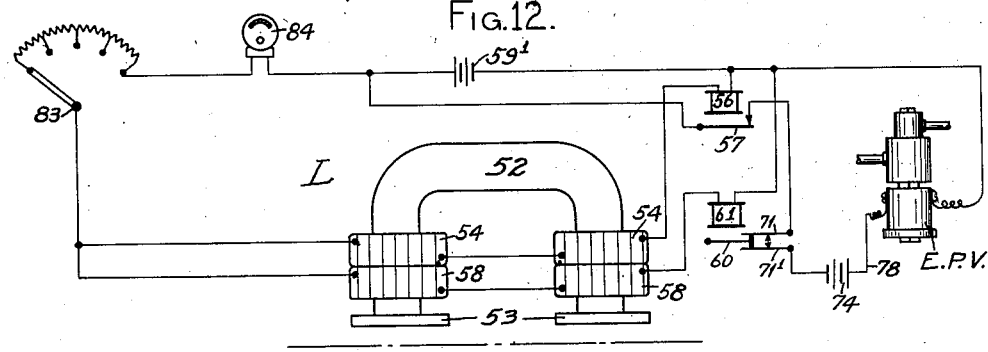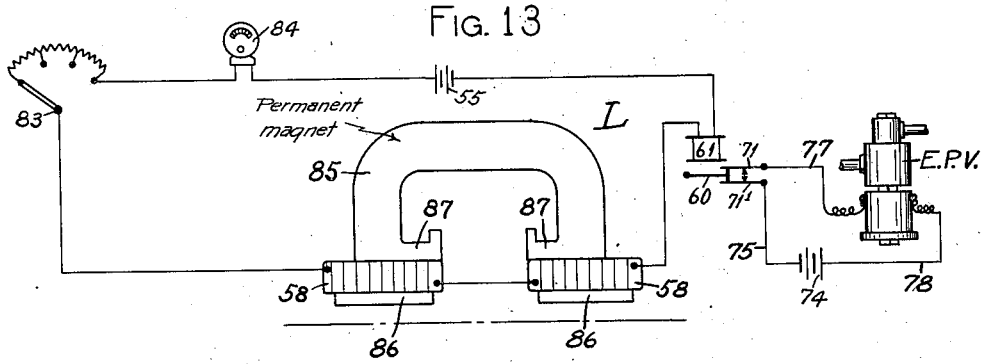

Oct. 26, 1937.  W. K. HOWE  2,096,936
AUTOMATIC TRAIN CONTROL SYSTEM
Filed April 3, 1919  7 Sheets—Sheet 5
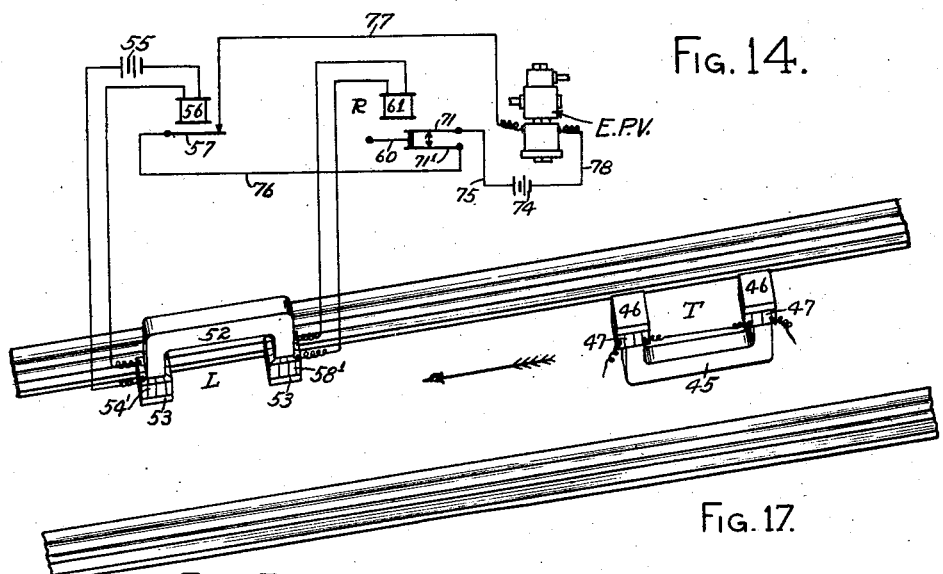
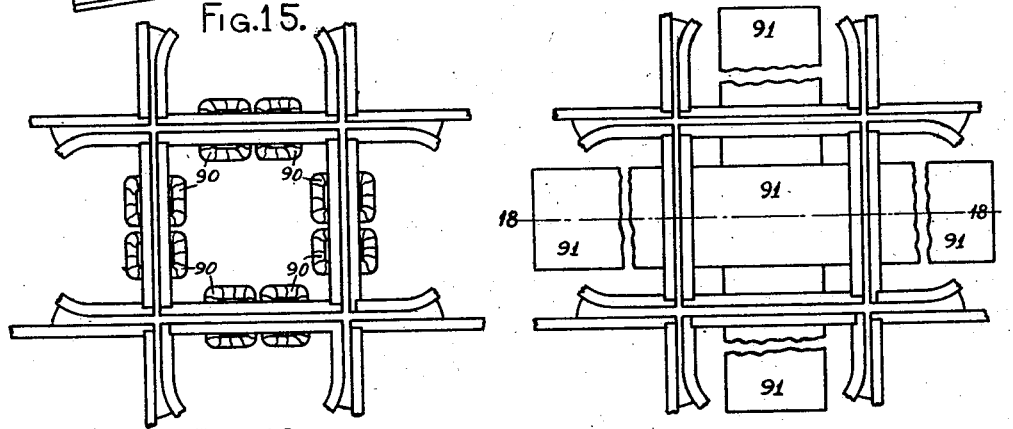
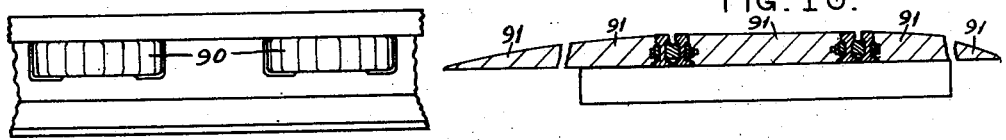
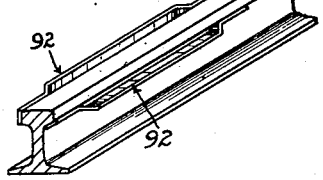
INVENTOR.
Winthrop K. Howe,
BY Neil D. Preston
ATTORNEY Oct. 26, 1937.                 W. K. HOWE                    2,096,936
                        AUTOMATIC TRAIN CONTROL SYSTEM
                  Filed April 3, 1919         7 Sheets-Sheet 6

INVENTOR
Winthrop K. Howe,
BY Neil D. Preston
ATTORNEY

Patented Oct. 26, 1937

2,096,936

UNITED STATES PATENT OFFICE 2,096,936

AUTOMATIC TRAIN CONTROL SYSTEM

Winthrop K. Howe, Rochester, N. Y., assignor to General Railway Signal Company, Rochester, N. Y., a corporation of New York Application April 3, 1919, Serial No. 287,132

85 Claims. (Cl. 246—63)

This invention relates to automatic train control systems.

Modern block signal systems and the methods of operating trains have been developed to such a degree that many of the serious railway accidents are due to a failure on the part of the engineer, rather than any failure of the signaling systems. Several things may cause or contribute to such man failure. For instance, the engineer may be occupied with other duties and not observe the signals set against him, or he may be asleep, or incapacitated, or perhaps in the state of mind where he fails to appreciate the significance of the signals. In attempting to obviate the occurrence of such accidents by some system of automatic train control, I consider it preferable to employ a system which operates as a supplementary or additional safeguard to the safety afforded by the block signaling system and the care ordinarily used by the engineer, rather than as a substitute for either the block signaling system or the skill and vigilance of the engineer, so that the ultimate safety of the train is dependent upon the well known efficiency and reliability of the block signaling system, the care and skill of the engineer, and finally upon the operation of the train control system.

In view of these considerations I propose in this invention to provide a system of automatic train control which will serve to forcibly call the engineer's attention to the fact that he has passed a caution signal and has entered a danger zone, and which will also act to cause an automatic application of the brakes, unless the engineer shows that he is alive to the danger by taking appropriate action.

One of the essential features of any system of train control is an efficient and reliable means for establishing communication between the train control apparatus on the locomotive, or control means therefor, and the traffic controlled elements along the track which are subject to control by the presence of other trains or dangerous conditions ahead, such that the necessary controlling impulse or influences required to control the operation of the train control apparatus on the locomotive may be effectively transmitted whenever dangerous conditions demand. Such means of communication between the track and a train should, it is believed, be one which acts inductively, that is, without any physical contact between any parts on the track and any parts on the train; and one of the principal objects of this invention is to provide a simple and reliable construction and arrangement of parts capable of transmitting controlling impulses by electromagnetic induction in such a way that the operation of the system will not be affected by weather conditions and can be arranged to operate satisfactorily with various clearances, types of rolling stock, and other practical working conditions.

Other specific objects and features of this invention will appear hereinafter as the description progresses, and the novel features of the invention will be pointed out in the appended claims.

For the purpose of disclosing my invention I have illustrated in the accompanying drawings in a simplified and diagrammatic way some of the various forms which the devices embodying my invention may take, this illustration being selected more with a view to make it easy to understand the construction, operation and characteristic features of a system embodying my invention, rather than with a view of showing the exact construction of parts preferably used in practice.

In describing the various modifications of my invention in detail, reference will be made to the accompanying drawings, in which like reference characters refer to corresponding parts in the several views, and in which:

Fig. 11 illustrates the application of current regulating devices to the form of car-carried apparatus shown in Fig. 4;

Fig. 12 shows the wiring connections which may be employed when a single battery is used in connection with the car-carried apparatus;

Fig. 13 shows a still further modification of the car-carried element in which a permanent magnet is used;

Fig. 14 shows how the car-carried element and the trackway element may be disposed lengthwise of the track;

Figs. 15 and 16 illustrate one way of preventing the track rails of a crossing from influencing the car-carried element;

Fig. 17 is a plan view illustrating another construction for preventing the track rails of the crossing influencing the car-carried element;

Fig. 18 is a vertical section on the line 18—8 in Fig. 17;

Figure 24:
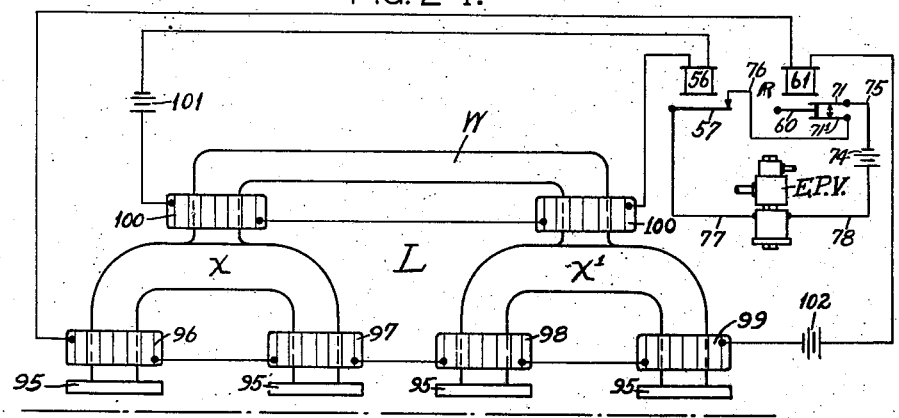
Figure 25:
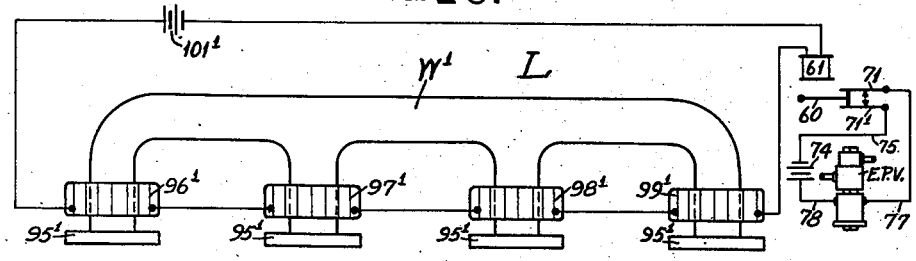
Figure 26:
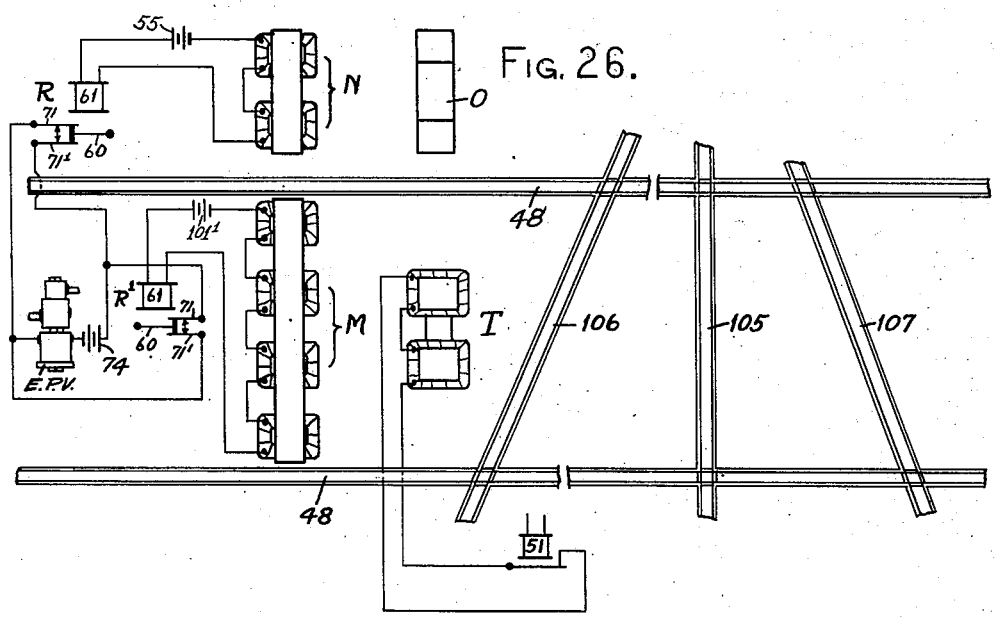
Figure 28:
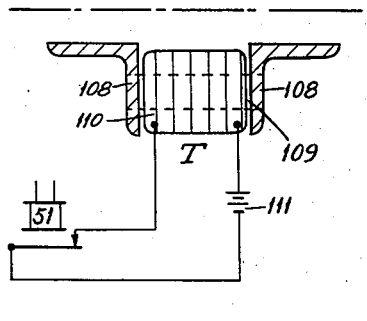
Figure 27:
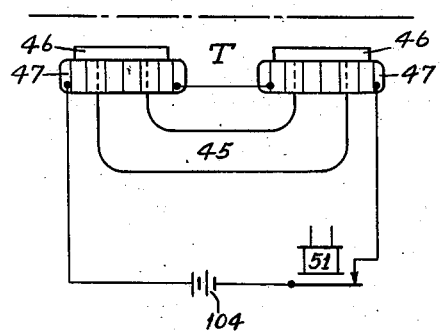

Figs. 19 to 23 inclusive illustrate modifications of coils and bonds for application to track rails to prevent them from influencing the car-carried element;

Fig. 24 shows a modified construction of the car-carried element which will not be improperly influenced by the track rails of a crossing;

Fig. 25 shows a modification of the construction illustrated in Fig. 24;

Fig. 26 illustrates another construction and arrangement of parts for preventing the car-carried element being improperly influenced by the track rails of crossings, cross-overs and the like; and Figs. 27 and 28 illustrate modified constructions of the trackway element.

Considering first the train control apparatus which I employ on locomotives, motor cars, or other railway vehicles, this apparatus is preferably constructed and adapted to exert a tendency to apply the brakes automatically, whenever a cautionary impulse signifying that a caution signal has been passed, is transmitted from the track to the vehicle and is further arranged such that the engineer may hold off or prevent this automatic application of the brakes if he desires, it being contemplated that this action on the part of the engineer will serve to forcibly remind him of the presence of danger ahead. Obviously, if the engineer is incapacitated, or for any other reason fails to take the appropriate action, the automatic train control device will act to cause an automatic application of the brakes, thus stopping the train and avoiding an accident. Various constructions and arrangements of parts may be employed to attain this desired result; and it should be understood that the constructions shown on the accompanying drawings are merely illustrative of the practical construction which such train control apparatus may take.

Figure 1:
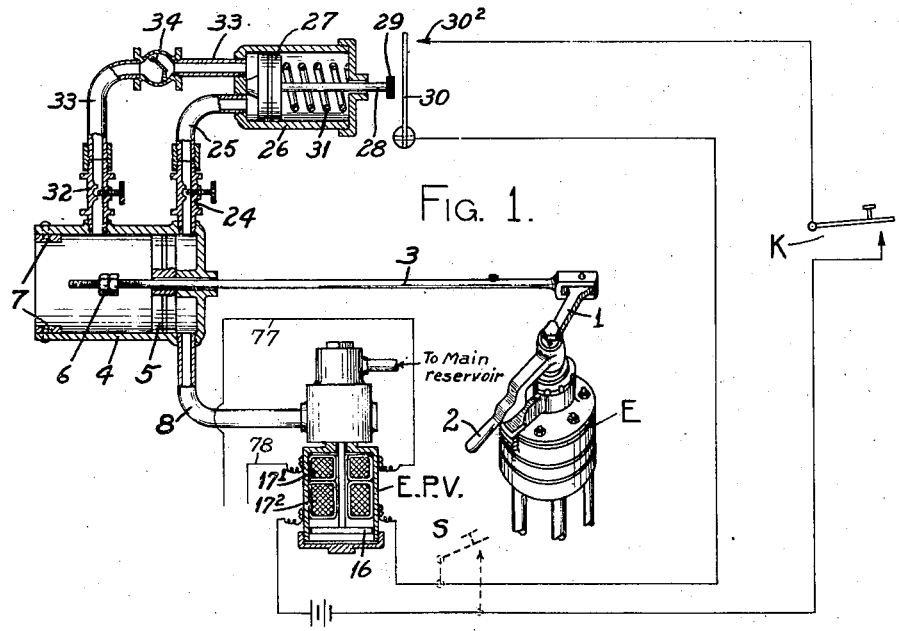
Figure 1 is a diagrammatic view, partly in perspective and partly in section, which shows the construction of one form of brake controlling apparatus embodying my invention.

Referring to Figure 1, I have shown a simplified arrangement of parts for acting upon the engineer's brake valve at each caution signal and tending to operate this brake valve to the service position. This engineer's brake valve, being of well known construction, is shown in a conventional form designated E. The device for operating this brake valve may be attached to it in various ways, but in the construction illustrated, an arm 1 is fastened to the usual stem or shaft of the brake valve to which the engineer's brake handle 2 is connected, this arm 1 being preferably fastened by a pin, seal, or the like, so that the engineer cannot detach it. To the arm 1 is pivotally connected one end of a rod 3, this connection being also preferably made by a riveted pin or the like, so that it cannot be readily detached. The rod 3 passes through one end of a cylinder 4 and loosely through a piston 5 in said cylinder; and the end portion of said rod is screw-threaded and provided with adjustable clamping nuts 6, for the purpose hereinafter described. Stops 7 are fastened to the inside of the cylinder 4 in position to limit the outward movement of the piston 5. Whenever a caution signal is passed, an impulse is transmitted from the track to the car, in the manner hereinafter explained, and causes deenergization of an electro-pneumatic valve, hereinafter referred to as the E. P. V., which acts to supply compressed air to the righthand side of the piston 5 through a pipe 8, from the main reservoir or other part of the system of air brakes commonly used. Various electro-pneumatic valves, suitable for performing this function, are well known in the art; and the construction of the valve E. P. V., which I have shown on the drawings, is merely typical of such devices.

Figure 6:
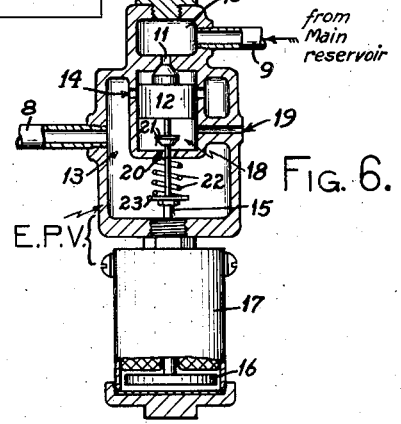
Fig. 6 is a sectional view showing the construction of one form of an electro-pneumatic valve constituting part of the system.

Referring to Fig. 6, in which is illustrated the construction of one suitable form of an E. P. V., the pipe 9, leading from the main reservoir or other source of compressed air, opens into a chamber 10, having a port 11 controlled by a piston valve 12. The pipe 8, leading to the cylinder 4, is in communication with a chamber 13, which is connected through opening 14 and port 11 with the chamber 10, when the valve 12 is unseated. The valve 12 is held closed in the position shown by a stem 15 attached to the armature 16 of a controlling magnet 17, so that when the magnet 17 is energized, its armature 16 is attracted to hold the valve 12 closed. The enclosed chamber 18 below the valve 12 is in communication with the atmosphere through the port 19; and this chamber 18 opens into the chamber 13 through an opening 20 adapted to be closed by a valve 21 on the stem 15, when the magnet 17 is deenergized and said stem 15 is in its lower position. A compression spring 22 is interposed between the bottom wall of the chamber 18 and a fixed collar 23 on the valve stem 15.

The operation of this type of electro-pneumatic valve will be readily understood by those skilled in the art and requires only brief explanation. Upon deenergization of the magnet 17, the pressure against the valve 12, together with the force of the spring 23, moves said valve 12 and its stem 15 downward. This uncovers the opening 14 and allows pressure to pass from the chamber 10 to the chamber 13 and thus through the pipe 8 to the cylinder 4. At the same time the valve 21 closes and cuts off communication between the pipe 8 and the atmosphere through the passage 19. It will be noted that the area of the piston valve 12 exposed to pressure when said valve is opened, is greater than that so exposed when the valve is closed. Consequently, while the magnet 17 is strong enough to hold the valve 12 closed, it is not strong enough to reclose this valve after it has once been opened, due to the increased opposition of the pressure. Thus, after the valve 12 has once opened, it will not reclose until additional attraction is exerted upon the armature 16, or else the pressure in the chamber 10 has been reduced to a predetermined amount.

In the arrangement shown in Fig. 1, the controlling magnet of the E. P. V. is provided with two windings $17^1$ and $17^2$, both acting upon the armature 16. The parts are so proportioned that when both of these windings 17¹ and 17² are energized, sufficient attraction upon the armature 16 is produced to reclose the valve 12. The winding 17¹, when energized, is strong enough to hold the valve 12 closed, but is not strong enough to reclose said valve; and this winding, which is normally energized, is momentarily deenergized whenever a caution signal is passed in the manner hereinafter explained. The other winding 17², constituting the resetting winding, is normally deenergized, but may be energized under certain conditions to be later explained.

Upon deenergization of the winding 17¹ of the E. P. V., air is supplied through the pipe 8 to the right-hand side of the piston 5, thereby moving said piston to the left up against the adjusting nuts 6. Unless the engineer takes hold of the brake handle 2 and holds it, the pressure against piston 5 will move the rod 3 and the arm 1, and thus move the engineer's brake valve to the service position. The movement of the piston is limited by the stops 7, and the amount of movement given to the rod 3 by such movement of said piston is determined by the adjustment of the nuts 6. In this way the apparatus can be readily adjusted so as to shift the engineer's brake valve to the service position accurately. Such movement of the engineer's brake valve to the service position will automatically result in a service application of the brakes for reasons well understood by those skilled in the art. Provision may, of course, be made so as to produce an emergency application of the brakes, if desired; but I consider a service application preferable and sufficient for safety, inasmuch as this application would occur at the caution signal and the length of the block is based upon service braking distance.

From the foregoing it will be observed that I have provided a simple and reliable device, adapted to be controlled electrically, and capable of moving the engineer's brake valve to the service position and thus automatically cause a service application of the brakes, unless the engineer holds off such application by taking hold of his brake handle. In some instances I may use a switch S, indicated in dash lines in Fig. 1, which is conveniently arranged for operation by the engineer, so that current may be supplied to the winding 17² of the E. P. V. and thus prevent the E. P. V. from operating, said switch S being preferably protected in some suitable manner so that it cannot be carelessly or maliciously kept closed.

It will be evident that the pressure tending to move the engineer's brake valve will exist so long as the valve E. P. V. remains open. In accordance with this invention, it is contemplated that this condition will exist for some desired predetermined interval of time, which in practice, will preferably be a few seconds, and then will cease.

To attain this result, appropriate means is provided for reclosing the E. P. V. after a short interval. In the construction shown in Fig. 1, the right-hand side of the piston 5 is in communication through a fitting 24, constituting an adjustable restricted orifice, and a pipe 25, with a cylinder 26. In the cylinder 26 is a piston 27 having a piston rod 28 which passes loosely through the head of said cylinder and carries a head or button 29, preferably of insulated material, which is adapted to strike a resilient contact spring 30 and move said spring into electrical contact with its cooperating contact point, shown conventionally as an arrow 30². The piston 27 is urged to the position shown in Fig. 1 by a compression coil spring 31. If the engineer holds off the automatic application, air is gradually exhausted through the restricted orifice 24, and after a lapse of a predetermined time, depending on the adjustment and proportioning of the parts, the piston 27 closes the contacts 30—30². The closing of these contacts may be utilized to energize the winding 17² and thus reclose the E. P. V., thereby cutting off the supply of pressure to the cylinder 4, and at the same time exhausting the pressure already in that cylinder through chamber 13, opening 20, and passage 19 (see Fig. 6).

In some instances it may be desirable to require the cooperation of the fireman before resetting of the E. P. V. can be obtained. This is readily accomplished by inserting a switch, as a switch K, in the circuit for the winding 17² in series with the contacts 30—30², such that the fireman must close the switch K before the E. P. V. can be reset. The switch K in practice is preferably located at some point convenient for operation by the fireman, but in such position that it cannot be closed by the engineer while he retains his hold upon the brake handle.

In order to more forcibly call the attention of the engineer to the caution signal, provision may be made such that if he makes a deliberate movement, the annoyance and difficulty of holding his brake handle for a long time will be avoided. Also, as it is desirable from a standpoint of safety to have the brakes applied at the caution signal, it is considered advantageous to construct the brake controlling apparatus so that the engineer will be encouraged to make a service application of the brakes at the caution signal, and will not deliberately hold off such application unless the circumstances require him to do so in order to prevent delay. In the construction shown in Fig. 1, this is accomplished by permitting the pressure in cylinder 4 to pass through another restricted orifice 32, pipe 33, and check valve 34 to the cylinder 26, in case the piston 5 reaches its left-hand position, corresponding to the service position of the engineer's brake valve. Thus, if the engineer moves his brake handle 2 to the service position, the piston 5 can move far enough to permit the air to exhaust into cylinder 26 through the restricted orifice 32 as well as through the restricted orifice 24. This causes the pressure to build up more rapidly behind the piston 27, so that the contacts 30—30² are closed after a shorter interval of time than in the case where the engineer holds off the application of the brakes. The parts are preferably proportioned such that, if the engineer holds off the automatic application of the brakes, the pressure in the cylinder 4 tending to produce such application will continue for a much longer time than if he were to move his brake handle to the service position. In other words, if the engineer makes or permits a service application of the brakes, he is relieved from the necessity of holding his brake handle for any prolonged interval. This will naturally encourage him to apply his brakes; and this action of applying the brakes, and then releasing them in order to continue at unrestricted speed, will all the more forcibly remind the engineer that he has passed a caution signal and has entered a zone of danger. The check valve 34 prevents air from passing from pipe 25 through pipe 33 and to atmosphere through the open end of the cylinder 4.

Figure 2:
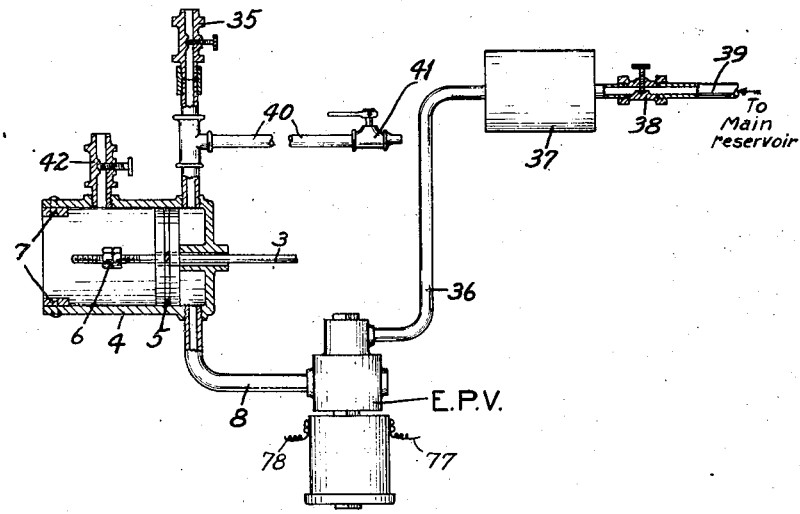
Figure 2 is a fragmentary view similar to Fig. 1 showing a modified construction of the brake controlling apparatus.

In Fig. 2 I have shown a different arrangement of parts for resetting the E. P. V. after the desired interval of delay. In this construction, the right-hand end of the cylinder 4 is in direct communication with the atmosphere through a restricted orifice 35. The supply of pressure to the E. P. V., instead of coming directly from the main reservoir, as in Fig. 1, is taken through pipe 36, from a small auxiliary reservoir 37, which in turn is fed through a restricted orifice 38 from a pipe 39 connected to the main reservoir. The restricted orifice 38 is made smaller than the restricted orifice 35. Consequently, when the E. P. V. opens, pressure is exhausted from the reservoir 37 and its connected pipes through the restricted orifice 35 faster than it is fed through the restricted orifice 38, so that the pressure acting upon the valve 12 of the E. P. V. is gradually reduced. After the lapse of a certain interval of time, depending upon the adjustment and proportioning of the parts, the pressure upon the valve 12 is thus reduced to an amount sufficient to permit the energized magnet 17 (which is only momentarily de-energized), to reclose said valve, whereby pressure is exhausted from the cylinder 4, as previously explained. If desired, provision may be made so that the fireman may aid the engineer by shortening the time he has to hold his brake handle. This is accomplished by providing a pipe 40 communicating with the right-hand end of the piston 4 in which is located a valve 41. The valve 41 is preferably located at a point convenient for operation by the fireman, but where it cannot be opened by the engineer while he retains hold of his brake handle. When the valve 41 is opened, the pressure is rapidly reduced from the cylinder 4, thus shortening up the time during which the engineer must hold on to his brake handle. This modification shown in Fig. 2 may also be arranged to provide an inducement to encourage the engineer giving or permitting a service application of the brakes. To accomplish this, an additional restricted orifice 42 is provided to exhaust the pressure from the cylinder 4 when the piston 5 is up against the stops 7, that is, in the position corresponding to the service position of the engineer's brake valve.

Obviously, various combinations and arrangements of the features above described may be made in practice. The application of pressure tending to move the engineer's brake valve to the service position may continue for a fixed interval of time regardless of whether or not the engineer causes or permits a service application, or the time interval may be made different in the two cases, by omitting or using additional restricted orifices 32 and 42, Figs. 1 and 2, in the way already described. Also, by providing the switch S, the engineer may prevent any tendency to move his brake valve; and by putting the switch S in series with the fireman's switch K, the cooperation of the fireman may be required to do this. Likewise, the fireman may be required to assist in the resetting, as illustrated by the construction shown in Fig. 1; or the cooperation of the fireman may be needed only to hasten the resetting, as in Fig. 2; or the cooperation of the fireman may not be required at all, which would be true if the switch K, Fig. 1, and the pipe 40 and valve 41, Fig. 2, were omitted. In short, the particular constructions illustrated in Figs. 1 and 2 are merely illustrative of the various forms which the brake control apparatus embodying my invention may take; and various other arrangements and constructions, involving the same principles and functions of operation, will be readily apparent to those skilled in the art.

Referring now to the impulse transmitting means embodying my invention, this comprises, generally considered, a trackway element T, and a cooperating element L, carried on the locomotive, motor car, or other railway vehicle.

Figure 3:
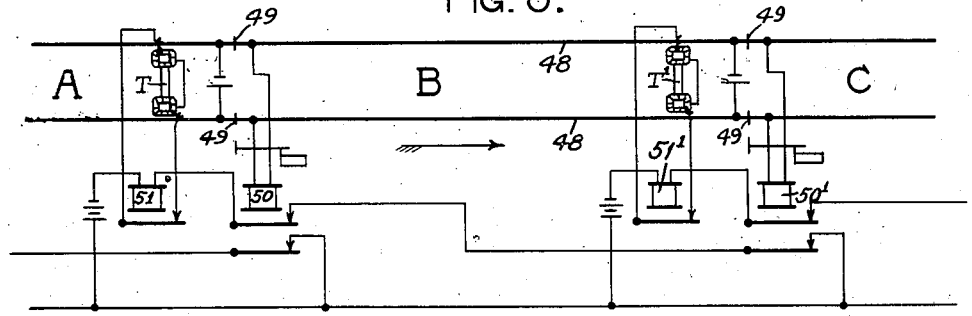
Fig. 3 shows diagrammatically one arrangement of track-way circuits which may be used in the train control system embodying my invention.
Figure 4:
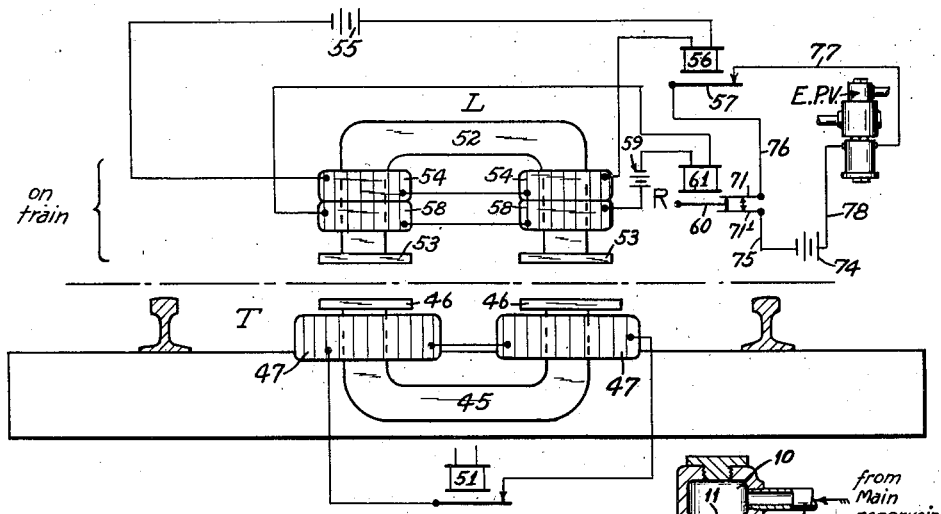
Fig. 4 is a diagrammatic view showing in elevation the construction and arrangement of parts constituting the car-carried element and the trackway element.

The trackway element T consists essentially of a U-shaped core or yoke 45, see Figure 4, having pole pieces 46 and two oppositely wound coils or windings 47, positioned on the legs of said yoke. This yoke 45 and pole pieces 46 are made of iron or other magnetic material, solid or laminated as conditions require. The pole pieces 46 are preferably disposed on the level or just above the top of the heads of the track rails, so as to be as close as possible to the car-carried element and yet be out of the way of all parts of the rolling stock. The trackway element T is given different controlling conditions, that is, is rendered capable of influencing or not influencing the car-carried element on a passing vehicle, by putting the coils 47 on open circuit or in a de-energized closed circuit of low resistance. While the circuit of the coils 47 may be controlled in any suitable way, I have illustrated in Fig. 3 one form of trackway circuits suitable for governing the controlling condition of the trackway element T in accordance with traffic conditions.

Referring to Fig. 3, the track rails 48 are divided by insulated joints 49 into blocks in the usual way, one block B with the adjacent ends of two other blocks A and C being shown. The parts and circuits associated with the various blocks A, B and C are the same, and for convenience will be given like reference characters, with distinctive exponents. Each of the blocks is provided with a track battery and a track relay 50, the same as in ordinary block signaling systems. Since my system of automatic train control is preferably used in connection with the usual fixed signals of the well known automatic block signal system, such signals are indicated conventionally in Fig. 3; but the circuits and devices for controlling the indications and aspects of these fixed signals, being well known in the art, have not been illustrated in order to avoid unnecessary complication. At a suitable distance in the rear of the pair of insulated joints 49 at the entrance of each block, is located the trackway element T, (the normal direction of traffic being from left to right as indicated by the arrow); and the circuit for the coils 47 of said trackway element is controlled by the contact finger or armature of a line relay 51, the controlling circuit of which includes front contacts of the track relays of the corresponding block and the next block in advance. For example, the line relay 51, controlling trackway element T at the entrance of the block B, is energized when neither the block B nor the block C is occupied, but is deenergized to open the circuit for the coils 47 when either of said blocks B or C is occupied. The particular form of trackway circuits shown in Fig. 3 is merely illustrative of the manner in which the trackway elements of my system are controlled in order to transmit a cautionary impulse at each caution signal, and not transmit such a cautionary impulse at a clear signal. Obviously, various modifications and alterations may be made in the particular trackway circuits illustrated, it being evident that various expedients may be employed to assure the opening or closing of the circuit for the coils 47 of the trackway element T at signaling points, depending upon traffic conditions in advance. Generally stated, the characteristic feature of the trackway circuits employed in my system of train control is that the coils 47 of the trackway element are in closed circuit, at a clear signal, but are open-circuited at a caution signal. In the trackway circuits shown in Fig. 3, the coils 47 of the trackway element are likewise open-circuited at a stop or danger signal; but this is not compulsory.

The car-carried element suitable for cooperating with the trackway element T may take various forms, some of which have been shown. In the construction shown in Fig. 4, the car-carried element L comprises an inverted U-shaped core or yoke 52, of solid or laminated iron or steel, and is formed with pole pieces 53, which are arranged to pass over the pole pieces 46 of the trackway element T. The air gap between the pole pieces 53 and 46 is preferably as short as practical working conditions will permit. I find that this air gap may be as long as four inches or more and still result in the transmission of the desired impulse, the size of the parts and the windings being, of course, properly proportioned. On the legs of the yoke 52 are coils 54, conveniently termed the primary or field coils which are so wound and connected as to provide magnetic flux in the same direction lengthwise of said yoke; and these coils are energized by current from a battery 55 on the vehicle which flows through a continuously closed circuit. This circuit may be readily traced on the drawing and includes a relay 56, conveniently termed the check relay, which is of any suitable or well known construction capable of dropping its armature 57 upon a predetermined reduction in the amount of current flowing through it. Also surrounding the legs of the yoke 52 of the car-carried element L, are two coils or windings 58, conveniently termed the secondary or inducing coils, which are also wound and connected to provide flux in the same direction in the yoke. These secondary coils 58 are connected in a normally closed circuit which includes a battery 59 and the winding 61 of a control relay R provided with a contact operating element 60. The coils 54 and 58 on the same leg of the yoke 52 are preferably wound and connected to their respective batteries so as to produce flux in the same direction. This control relay R is of any suitable type capable of opening its contacts upon either an increase or a decrease in the normal current for which it is adjusted.

Figure 5:
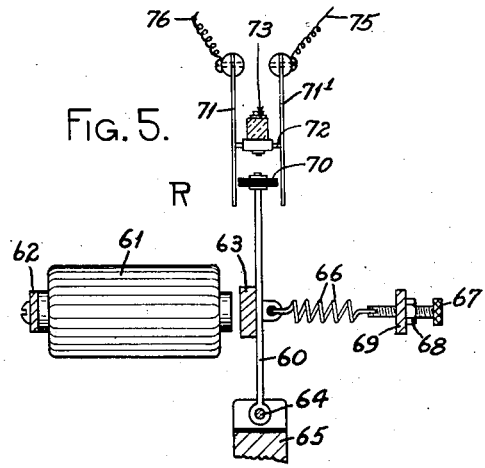
Fig. 5 is a diagrammatic view showing the preferred construction of the control relay forming part of the car equipment.

One form of construction of the control relay R is shown in a simplified and diagrammatic way in Fig. 5. In this construction the winding of the relay comprises the usual pair of coils 61 (only one of which is shown), connected by a back strap 62 and adapted, when energized, to attract a bar-armature 63 carried by the contact operating element 60 which is shown pivoted supported at its lower end on a pin 64 secure to a fixed member 65. The movement of the armature 63 toward the magnets 61 is opposed by a tension spring 66 which is provided with any suitable means, such as adjusting screw 67 and locking nut 68 cooperating with a fixed support 69, for regulating its tension. The armature support 60 carries an insulated striking piece 70 at its upper end, which is positioned between a pair of resilient contact springs 71—71¹. Between the contact springs 71—71¹ are two contact points 72 supported by a suitable fixed member 73 of insulating material. When the magnets 61 of the relay are energized by normal current, the spring 66 is adjusted so that the contact springs 71—71¹ are both in contact with their respective contact points 72, the armature 63 being in a balanced position. The striking piece 70 is preferably made slightly shorter than a space between the contact springs 71—71¹ in order that the armature 63 may have a slight movement from its middle balanced position before acting against said contact springs. It will be evident that a decrease in the normal current through the magnets 61 will permit the spring 66 to overbalance the attraction of the armature 63, thus separating the right-hand contact spring 71¹ from its contact point 72. If the current through the magnet 61 is increased above that normally flowing, and for which the relay is adjusted, the attraction of the armature 63 over-balances the opposition of the spring 66, thereby separating the other cooperating contact 71—72. The circuit controlled by the relay R passes from one contact spring 71 through the contact points 72 to the other contact spring 71¹, as indicated. Thus, whenever the current for which the relay is adjusted, is either increased or decreased, the circuit controlled by the relay will be opened. The circuit for normally energizing the E. P. V. may be traced as follows: Commencing at the battery 74, wire 75, contact 71¹—72—71 of the control relay R, wire 76, contact finger 57 of the check relay 56, wire 77, magnet 17 of the E. P. V. and wire 78 back to the battery. The safe and proper operation of the system requires that the field coils 54 must be energized and creating sufficient flux to result in inducing current in the secondary coils 58, when the car passes an open-circuited trackway element, in the manner more fully explained hereinafter in the description of the operation. The check relay 56 insures the integrity of the circuit for energizing the field coils 54, since this relay will open its contacts whenever the current in this circuit falls below a predetermined value, due to the breaking of the circuit or depreciation of the battery 55. An excessive current in the field coils 54 will only serve to increase the inducing action, at least within narrow limits depending upon the design of the magnetic circuits and coils; and consequently, the check relay 56 may properly be a minimum current device. In order to afford protection against crosses, short circuits, and the like, in connection with the energizing circuit for the field coils 54, the check relay should be similar in construction to the balanced type of relay shown in Fig. 5. In a similar way the control relay R checks the integrity of its circuit through the secondary coils 58, since any break or cross of the wires, or depreciation of the battery 59, results in opening the contacts of said control relay, due to the increase or decrease in the current normally flowing, and for which said relay is adjusted. Thus, the balanced type of relay R not only acts as a device for detecting the current induced in the secondary coils 58 under dangerous traffic conditions, but also insures that the current normally flowing in this circuit will be maintained within the narrow limits required for satisfactory operation. If an ordinary relay, operating upon a minimum current, were put in the circuit for the secondary coils 58 for the purpose of detecting the current induced in said coils, it is evident that the current normally flowing through such relay should not be much in excess of the dropaway current; otherwise, the induced voltage might not be strong enough to reduce the normal current sufficiently to cause such a relay to drop away.

Therefore, the use of a balanced type of relay, such as shown in Fig. 5, has the advantage that it simplifies the system by combining in one device the requisite functions of a checking and a detecting relay.

The operation of my inductive device for transmitting impulses from the track to a passing vehicle, according to the construction shown in Fig. 4, is as follows: Under dangerous traffic conditions, that is, when the cautionary impulse should be transmitted, the line relay 51 is de-energized, as previously explained, and the coils 47 of the trackway element are open-circuited. When the car-carried element L approaches and comes directly over the track element T, the reluctance of the magnetic circuit through the yoke 52 of the car-carried element is greatly decreased, by reason of the fact that the trackway element affords a magnetic bridge for conducting flux between the pole pieces 53 of said yoke. Consequently, the flux through the legs of the yoke 52, and likewise through the inducing or secondary coils 58, normally produced by the field or energizing coils 54, is greatly and rapidly increased. This change in the flux through the secondary coils 58 produces an induced voltage in said coils. As the yoke 52 of the car-carried element L recedes from the trackway element T, the flux through said yoke and the secondary coils 58 is decreased, thereby inducing a voltage of opposite polarity. Such induced voltages conform with the well known principles of electromagnetic induction, and the polarity or direction of the induced voltage upon a change in flux is in a direction to tend to cause a flow of current which will create magnetic flux opposing the flux being changed. If the secondary coils 58 are so wound and connected to their energizing battery 59 as to send flux in the same direction as the flux being changed, then upon the increase in the flux through these coils the induced voltage will oppose the voltage of the battery, and upon decrease of the flux the induced voltage will be in a direction to add to the voltage of the battery. Thus, the voltage induced in the secondary coils 58 opposes or adds to the voltage of the battery 59, during the increase in flux as the car-carried element approaches the track element T, dependent upon the relative direction of the flux being increased and that produced by the current in the secondary coils and this changes the current normally flowing through the windings and the control relay R, thereby interrupting the circuit for energizing the E. P. V. and causing the train control apparatus to operate in the manner previously described. It is found in practice that the current induced in the secondary coils 58 during the passage of the car-carried element over the trackway element, is in effect a single cycle of alternating current, although the shape of the voltage and current waves are somewhat distorted. This reversal in polarity in the induced current also serves, it is believed, to assure the proper operation of the relay R, since the alternation in polarity causes an alternate increase and decrease in the current normally flowing in said relay which will open at least one of the pairs of contacts.

Under clear traffic conditions, that is, when the vehicle is passing a clear signal, the coils 47 of the trackway element T are in a de-energized closed circuit of low resistance, thus providing a number of short-circuited turns around each leg of the yoke 45 of said trackway element. When the car-carried element L passes over a trackway element T having its coils 47 in closed circuit, it is found in practice that the flux through the secondary coils 58 of the car-carried element L is not materially altered; and consequently, current sufficient to cause operation of the control relay R is not induced. I attribute this action to the opposition or "bucking" action of the current induced in the closed-circuited coils 47 of the trackway element T, which prevents material change in the flux through the yoke 52 of the car-carried element.

Figure 7:
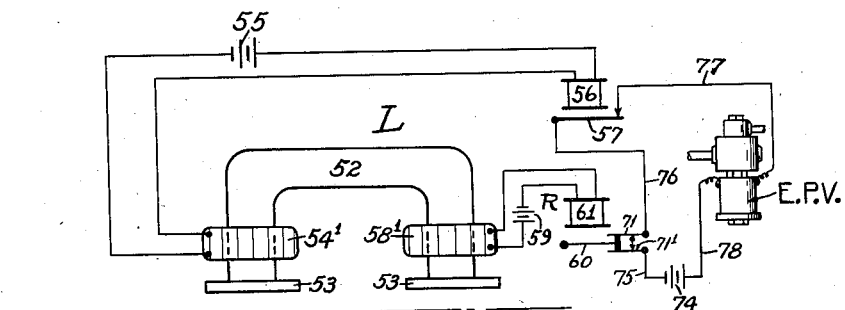
Figs. 7 and 8 show modified constructions and arrangements of parts of the car-carried element.

Instead of using oppositely wound pairs of field and secondary coils on the car-carried element, as shown in Fig. 4, one field coil $54^1$ may be placed upon one leg of the yoke 52 and one secondary coil $58^1$ upon the other leg of said yoke, as shown in Fig. 7. The other parts and circuits in this modified construction are the same as in Fig. 4, and are given the same reference numbers.

Figure 8:
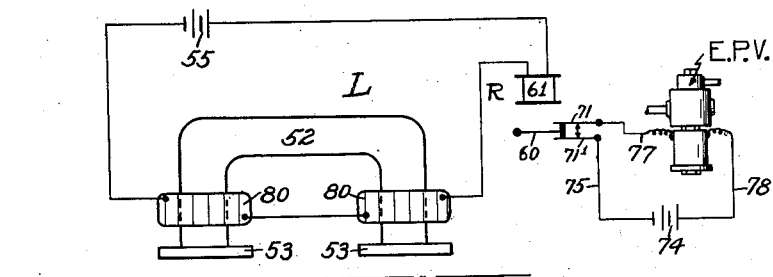

Another modified construction is shown in Fig. 8, in which the field and the secondary coils are combined into one. In this modification two oppositely wound coils 80 are placed on the legs of the yoke 52, and these coils are connected in circuit with a battery 55 and the control relay R. The operation of this modification is similar to that already described. Under dangerous traffic conditions, the flux produced by the coils 80 is greatly altered when the vehicle passes over a trackway element; and this results in operating the control relay R. It will be observed that this modification dispenses with the check relay 56.

Figure 9:
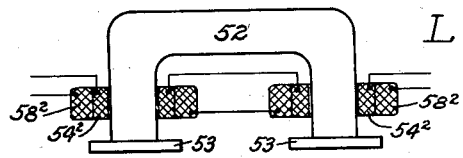
Fig. 9 shows a modified arrangement of the coils of the car-carried element.

Fig. 9 shows a modified way of disposing the field coils $54^2$ and the secondary coils $58^2$, one inside the other upon the yoke 52 of the car-carried element L.

Figure 10:
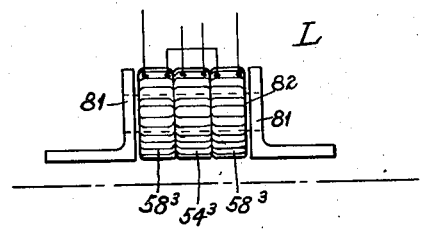
Fig. 10 shows a still further modification of the construction of the car-carried element.

Fig. 10 shows another arrangement of the magnetic circuit and coils for the car-carried element L. In this modification the yoke or core is formed by two angle shaped members 81 connected by a core 82. The coils of the car-carried element are placed on the core 82. In the particular arrangement shown in Fig. 10, two secondary coils $58^3$, connected in series, are disposed on the opposite sides of a single field coil $54^3$. Obviously other arrangements of coils, cores or the like may be employed without departing from my invention, according to the wishes of the designer and practical requirements.

In the type of impulse transmitting means embodying my invention, the current in the car-carried coils should be maintained constant within narrow limits for the most satisfactory operation; and when this current is supplied from a source, such as the storage battery, in which there is considerable variation in voltage, it is desirable to provide adjusting means for maintaining the current substantially constant. In Fig. 11, I have shown such a regulating or adjusting means applied to the car-carried element constructed as shown in Fig. 4. In the circuit for the field coils 54, and also in the circuit for the secondary coils 58, is interposed an adjustable resistance or rheostat 83, illustrated in a conventional form, and also preferably an ammeter 84 or other suitable indicating device. It is contemplated that the rheostats 83 will be adjusted by the engineer or other authorized person, when required, so as to maintain the proper current in the coils 54 and 58. It will be noted that the current in the circuit for the field coils 54, which also includes the check relay 56, cannot fall below a predetermined value, without causing operation of the train control apparatus due to the opening of the contacts of the check relay. Likewise, the current in the circuit including the secondary coils 58 and the control relay R cannot fall below or rise above a predetermined value without causing operation of said control relay.

In the constructions of the car-carried apparatus hereinbefore discussed, two or more batteries for supplying current to the various devices have been shown for simplicity. Fig. 12 illustrates how the circuit may be arranged so that only one battery 59[1] may be used for energizing the various devices. It will be evident, of course, that in this arrangement, as well as in the other various modifications of my invention, the voltage of the battery and the resistances of the various devices should be properly proportioned, in accordance with principles well known in the art, so as to produce the desired operation.

In the modification shown in Fig. 13, a permanent magnet 85 with pole pieces 86 is employed instead of the yoke 52, the field coils 54, the battery 55, and the check relay 56, as shown in Fig. 6. In this construction, when the car-carried element passes over a track element T having its coils open-circuited, the flux of the permanent magnet 85 acts to induce current in the secondary coils 58 in the same way previously described. This inducing action may be accentuated by providing projections, such as 87, to afford a leakage path for the flux of said permanent magnet. The reluctance of the leakage path through the projections 87 is made less than that between the pole pieces 86 of said magnet, but is greater than that through the yoke of the track element and the intervening air gaps, so that a large proportion of the leakage flux normally passing through the projections 87 is deflected through the secondary coils 58 upon passing a track element T having its coils 47 open-circuited. It will be evident to one skilled in the art that a similar arrangement of paths for leakage flux may be applied, if desired, to the other modifications.

In the systems previously described, the trackway element T is arranged crosswise of the track between the track rails, as shown in Figs. 3 and 4. This disposition of the trackway element is, however, only one of the various arrangements which may be employed. In Fig. 14 I have illustrated an arrangement in which the trackway element T, and likewise the car-carried element L, are arranged lengthwise of the track, preferably at one side of the center line. The normal direction of traffic is preferably from right to left, as indicated, in order that the field coil 54[1] may pass first over the trackway element, it being found that better operation occurs with this arrangement. This arrangement provides for transmitting cautionary impulses to a locomotive or car traveling head-end first in the normal direction of traffic, but does not transmit such impulses when the car or locomotive travels opposite to the normal direction of traffic. Obviously, the same disposition of trackway elements at one side of the center line of the track may be employed when the trackway elements are arranged crosswise of the track, as shown in Figs. 3 and 4; but in many respects the lengthwise arrangement shown in Fig. 14 is preferable for this purpose because of the smaller space occupied crosswise of the track, thus permitting greater displacement from the center line of the track. In Fig. 14 the construction of the car-carried apparatus is shown corresponding with that shown in Fig. 7, but it is evident that any one of the other constructions of the car-carried apparatus may be likewise employed.

From a consideration of the operation of the various forms of impulse transmitting means previously described, it will be noted that the cautionary impulse is transmitted when the yoke 52 of the car-carried element L is bridged by a body of magnetic material on the track, this being the case when the coils 47 of the trackway element T are open-circuited. Under practical conditions, various bodies or masses of iron along the track will be encountered by the locomotive or other railway vehicle, such as various arrangements of track rails at crossings, crossovers, switches and the like. The effect of such track rails, or other masses of iron on the track, upon the car-carried element L depends, it will be observed, upon the reluctance of the magnetic path they provide. In practicing my invention I contemplate that the trackway elements T will be of such size and shape as to influence the car-carried element L to a far greater extent, when its coils are open-circuited, than track rails or other such bodies of iron. In this way the desired operation will be produced at the signaling points by a track element T having its coils open-circuited, but will not be improperly produced by track rails or other masses of iron at other places along the track. Also, if desired, provision may be made such that the track rails will not have any appreciable influence upon a car-carried element. For instance, short-circuited coils may be passed through the web of the track rails at the points over which the pole pieces 53 of the car-carried element pass. In Figs. 15 and 16 I have shown this principle applied to the track rails of a crossing. In this construction, short-circuited coils 90 are passed through the web of the track rails of the crossing, preferably just below the head of such rails, as shown in Fig. 16; and these short-circuited coils 90 are spaced apart and located in such position as to be substantially under the pole pieces 53 of the car-carried element L upon a passing vehicle. It will be evident that the coils 90 tend to prevent change in the flux through the yoke 52 of the car-carried element L, sufficient to induce current in the secondary coils 58 and cause operation of the control relay R, in substantially the same way as the short-circuit coils 47 of the trackway element T choke back the flux and prevent operation of the control relay under clear traffic conditions. If the arrangement of Fig. 14 is used, only one coil 90 need be used, as will be obvious.

Fig. 17 illustrates another construction for preventing operation of the train control apparatus by the track rails of a crossing. In this construction bodies or masses of iron 91, with very gradually sloping ends, lead up to the track rails of the crossing, extend between said track rails at substantially uniform heighth, and then slope downward again gradually. These masses of iron 91 are disposed between the track rails in position so that the pole pieces 53 of the car-carried element pass over them. The slope or inclination of the end portions of these bodies of iron is made so gradual that the change in flux through the yoke 52 of the car-carried element is likewise so gradual that not enough current is induced in the secondary coils 58 of said car-carried element, to cause operation of the control relay R. This modification of Fig. 17 forms the subject matter of a divisional application, Ser. No. 624,250, filed March 10, 1932. now Patent No. 1,524,396 dated January 27, 1925.

Fig. 19 illustrates a modification in which bonds 92, of copper or other good conducting material, are welded, or otherwise suitably fastened to the head of the track rail so as to constitute in effect a short-circuited turn or loop, formed in part by the track rail itself, which is adapted to produce the same effect as the coils 90 shown in Figs. 15 and 16. On the outside edge of the track rail, this bond 92 is fastened to the sides of the head of the track rail, but on the inside edge of said rail, the bond is fastened underneath the head of the rail so as to clear the wheel flanges.

Figure 20:
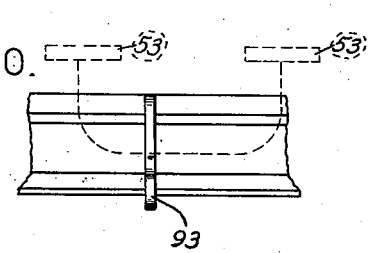

In the modified construction shown in Fig. 20 a single short-circuited coil 93, extending through the web of the track rail directly under the head thereof, and having its axis extending longitudinally of said track rail, is employed instead of the two coils 90 disposed as shown in Figs. 15 and 16. In this construction, the coil 93 is positioned so that the flux from the pole pieces 53 (shown in dotted lines in Fig. 20) must pass through this coil, as indicated. This passage of the flux through the coil 93, and the resultant current induced in said coil, chokes back the flux from the car-carried element and prevents operation of the control relay R, in the same way as previously explained. In order to choke back the flux which may tend to pass through the head of the rail, a band or coil 93 may be placed in a cross-cut or slot in the head of the rail, or in the space between the two adjacent ends of separate rail sections, the rail at this point being preferably reinforced by the usual angle bars and bolts. This modification is illustrated in Fig. 21.

Figure 21:
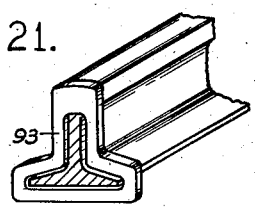
Figure 22:
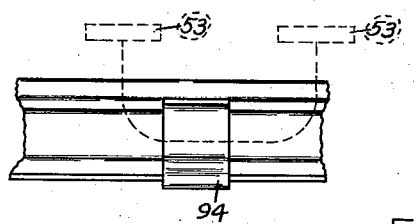
Figure 23:
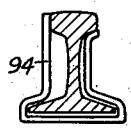

If desired, a single bond 94, of copper or the like, may be welded to the head of the track rail, as shown in Figs. 22 and 23, so as to constitute a single short-circuited turn or loop equivalent in its effect to the coil 93 shown in Figs. 20 and 21.

Obviously, these various constructions illustrated in Figs. 15 to 23, inclusive, while shown applied to track rails, may be employed in connection with any other magnetic bodies capable of improperly influencing the car-carried element.

In the schemes previously discussed which are intended to prevent operation of the train control apparatus by the track rails of crossings and the like, the construction of the car-carried element is not modified, but some provision is made at the required places along the track to neutralize or modify the magnetic effect of the foreign body on the track. In Fig. 24 I have illustrated a modified construction of the car-carried element L which has the characteristic that it will not be affected by passing over the track rails at crossings. In this construction there are two inverted U-shaped yokes X and X¹ connected at their middle points by a cross-bar W, preferably of smaller cross-section than the legs of said yokes X and X¹, for the purpose hereinafter explained. The legs of the yokes X and X¹ are each provided with pole pieces 95 and a coil, as 96, 97, 98 and 99. The two pole pieces on the innermost adjacent legs of the yokes X and X¹ are located at the proper distances apart to pass over the pole pieces 46 of the trackway element T, show in Fig. 4; and the coils 97 and 98 on these legs are wound oppositely and correspond with the secondary coils 58 shown in Fig. 4. The coil 96 is wound oppositely to the coil 97, that is, so that when voltage is induced in said coils by a change in the flux passing through these coils in the same direction, either up or down, such flux being derived from the field coils 100, these voltages will be opposing; and likewise the coil 99 is wound oppositely to the coil 98. The coils 96, 97, 98 and 99 are connected in series in circuit with a battery 102 and the control relay R, of the construction previously explained. By reason of the way in which the coils 96 to 99 inclusive are wound and connected, a change in flux passing downward through the core and the coil 97 thereon and upward through the coil 98, or vice versa, produces voltages in said coils 97 and 98 which add together in the series circuit, while a change in flux passing either upward or downward in the same direction through the coils 98 and 99, induces voltages which subtract or oppose each other in the series circuit. On the legs of the cross-bar W are field coils 100, which are constantly energized from a battery 101 through a circuit including the winding of a check relay 56, corresponding with the check relay used in the construction shown, for example, in Figs. 4 and 7. The check relay 56 and the control relay R govern the operation of the E. P. V. in the same way as previously explained.

When the car-carried element, of the construction shown in Fig. 24, passes over a trackway element T, such as shown in Fig. 4, and the coils 47 of said trackway element are short-circuited, no effect is produced, for the reasons hereinbefore explained. If the coils 47 of said trackway element T are open-circuited, however, the flux through the secondary coils 97 and 98 is greatly changed to induce a current therein. If the cross-bar W is made of such cross section as to be substantially saturated, the effect is increased, because with normal current flowing in the coils 100, an increase in the flux through the coils 97 and 98 necessarily results in decreasing the flux through the coils 96 and 99, thereby inducing current in these coils; and since the coils 96—97 and 98—99 are wound oppositely to each other, and the change of flux through these coils is in the opposite direction, the currents induced therein will assist each other. These induced currents modify the current normally flowing through the winding of the control relay R, due to the battery 102, and cause it to open its contacts and operate the E. P. V., all as previously explained. If now the car-carried element shown in Fig. 24 should pass over a track rail of a crossing, the flux through each of the four coils 96, 97, 98 and 99 will be changed substantially alike; and these several coils are wound and connected, as previously explained, so that the voltages induced therein will neutralize each other, thereby producing no operation of the control relay. The pole pieces of the car-carried element are preferably so located with reference to the trackway that the track rails of crossings and the like, ordinarily encountered, will influence the flux through these pole pieces substantially the same; and in any event, so that the effect of such a track rail will be neutralized to such an extent that no operation of the control relay will occur.

In Fig. 25 I have shown a modification of the construction of the car-carried element shown in Fig. 24. In this modified construction, the field coils 100 are omitted, and a single cross member or yoke W¹ connects the cores or legs upon which the combined field and secondary coils 96¹ and 99¹ inclusive are mounted. In view of the previous discussion of the operation of the modification shown in Figs. 8 and 24, the operation of this modified construction will be evident without further explanation.

Another arrangement for preventing an impulse being improperly transmitted at crossings, crossovers, and the like, is shown in Fig. 26. In this arrangement, there are two car-carried elements M and N. The car-carried element M is shown constructed the same as that shown in Fig. 25, although the construction of Fig. 24 may also be used; and the car-carried element N is the same as that shown in Fig. 8. Between the track rails 48 and in position to cooperate with the two inner cores of the car-carried element M, is a trackway element T, the same as that shown in Fig. 4. At one side of the trackway element T, preferably on the outside of one of the track rails, is disposed a mass of iron O, preferably U-shaped, which is arranged to cooperate with the pole pieces of the car-carried element N. The control relays R and R¹, governed by the car-carried elements N and M, respectively, have their contacts included in two multiple branches of the controlling circuit for the E. P. V., so that the contacts of both of these control relays must be simultaneously operated before the E. P. V. is deenergized. The control relay R is operated at each signaling point, irrespective of traffic conditions, since the mass of iron O always induces current in the coils of the car-carried element N. The control relay R¹ is operated at the signaling points under dangerous traffic conditions, but is not operated under clear traffic conditions. Consequently, the E. P. V. is operated or not operated at the signaling points depending upon traffic conditions in advance. If all of the pole pieces of the car-carried element M simultaneously pass over a magnetic body, as the track rail of the right-angle crossing (indicated at 105, Fig. 26), the control relay R¹ is not operated, for the reasons hereinbefore explained in connection with the discussion of the construction shown in Fig. 24. When the track rail of a crossing or crossover extends at an angle across the main track rails, the successive influencing of the cores of the car-carried element M may, under certain adverse circumstances, cause operation of the control relay R¹; but the angular position of the track rail required to do so is such that the car-carried element N will be influenced either at some time later or at some time earlier during the passage of the car, so that both of the control relays R and R¹ are not simultaneously operated. For example, a track rail, as 106, positioned at such an angle that it may cause operation of the control relay R¹, will not influence the trackway element N and operate the control relay R until after the car-carried element M has moved beyond the influence of said track rail and the control relay R¹ is closed. If the track rail of the crossing or crossover is disposed at another angle, as indicated at 107, the relay R will be operated first, and then perhaps the relay R¹. In any event, the E. P. V. is not operated. These modifications of Figs. 24, 25, and 26 form the subject matter of a divisional application, Ser. No. 614,591, filed January 24, 1923, now Patent No. 1,526,294 dated February 10, 1925.

In the various modified constructions hereinbefore considered, the trackway element T is changed from the clear to the caution controlling condition by open-circuiting its coils. This arrangement has the advantage that no energy is required along the track to control the trackway element and change it from a caution or stop to a clear controlling condition. This is a matter of considerable importance where the sources of current available along the trackway, such as the primary batteries used for the block signaling system, cannot be practically used to supply any great amount of current for any prolonged time. If desired, however, the trackway element may be placed in condition so as not to influence the car-carried element on a passing train by supplying current to its coils, as the coils 47, to magnetize the yoke of said trackway element with a polarity opposite to the polarity of the yoke 52 of the car-carried element. Such a construction is shown in Fig. 27, in which the coils 47 of the trackway element T are energized from a battery 104 or other source of current, when the line relay 51 is picked up. Fig. 28 shows another similar construction. In this construction shown in Fig. 28, two angle-shaped side bars 108, connected by one or more cross cores 109, are positioned along the trackway, the side bars 108 extending a distance lengthwise of the track sufficient to obtain the desired duration of impulse. The cross core 109, or each of them, if there are more than one, carries a coil 110, which is energized from the track battery 111 when the line relay 51 is picked up, and is deenergized when said line relay is deenergized. The polarity of the side bars 108 is such as to be opposite to the polarity of the pole pieces 53 of the car-carried element L. The operation of this construction will be evident. Under dangerous traffic conditions, the side bars 108 with their connecting core or cores 109, constitute a magnetic bridge which produces a rapid change in the flux through the secondary coils 58 of the car-carried element, all as previously explained. Under clear traffic conditions, the flux produced by the energized coil or coils 110 oppose or "bucks out" the flux tending to flow through the trackway element, thereby preventing inducing of current in the secondary coils 58 of the car-carried element, sufficient to cause operation of the control relay R.

It will be evident that the impulse transmitting means embodying my invention is simple and rugged in construction and will not be affected by weather or other adverse conditions encountered in practice. The train control apparatus on a vehicle acts in a simple and reliable manner to compel the engineer to observe the fixed signals and take appropriate action in recognition of each caution signal, otherwise there will occur an automatic application of the brakes, which the engineer will naturally wish to avoid and which may be made the basis for disciplining or penalizing the engineer, if desired. The system, however, will be an aid, rather than a hindrance, to the rapid and safe movement of trains, because the system does not prevent the engineer from exercising his judgment and skill so as to avoid unnecessary delays; yet safety is afforded because the existence of dangerous traffic conditions is forcibly called to the engineer's attention, so that he may be depended upon to control his train safely. Furthermore, if the engineer is ill, dead, or otherwise incapacitated, the brakes will be automatically applied at the caution signal in ample time to bring the train to a stop and avoid the possibility of an accident.

It should be noted that the operation of the system is dependent upon the functioning of devices which have well recognized dependability. The reliable performance of track circuits and various other parts of automatic block signaling systems has been thoroughly established by long trial and experience, and the impulse transmitting means and automatic train control apparatus of my system likewise consists of simple devices capable of accurate performance. Thus, without undue complication and expensive apparatus, I have provided a system in accordance with my invention which will obviate, to a large extent, if not entirely, the occurrence of accidents upon railways due to the failure of man power.

In disclosing my invention I have selected simplified forms of construction, it being understood that various amplifications and modifications in accordance with good design and engineering practice, would be made in the specific construction shown and described when putting my invention to practical use. For instance, the car-carried element L would be firmly secured to some appropriate part of the frame or running gear of the locomotive, motor car or other railway vehicle, and would be placed in a suitable casing to protect it from the weather. The particular location and manner of supporting this car-carried element would vary upon different equipments, but in all cases an ample clearance, of four or more inches above the level of the tops of the track rails, could be readily provided so that the car-carried element would not be struck or injured by the track rails at crossings and the like, or by other similar projections usually encountered along railways. It will be evident that the distance of the car-carried element above the track rails will vary as the wheels of the vehicle wear down, or are replaced by new wheels; and I contemplate the provision of suitable means for adjusting the car-carried element vertically to compensate for such variations.

The trackway element is fastened securely in any appropriate manner to the ties of the track, either between or outside of the track rail according to which arrangement is best suited to the conditions of the particular installation, and this trackway element would be preferably housed and protected against dragging objects on passing trains, by a planking or housings of wood or some other non-magnetic material. The trackway element may be located at any desired point along the track where it is required to transmit a cautionary impulse to passing vehicles, and may be located at the approach to sharp curves, or other fixed hazards, as well as adjacent to the fixed signals of the block signaling system. With the arrangement of trackway circuits shown in Fig. 3, the trackway element may be located at any point with reference to the entrance of a block, providing it is in the rear of the insulated joints at the entrance of the block, so that the vehicle will not stop itself by entering the block and putting the trackway element in its caution controlling condition. It will be evident, however, that if a different arrangement of trackway circuits is used, in which the trackway element at the entrance to a block is not controlled by the track relay of that block, the various trackway elements may be placed in advance of the fixed signals, if circumstances make it desirable to do so. The control relay R and the E. P. V. would be placed in practice in a suitable casing or cabinet on the vehicle and protected from jar and vibration by spring supports or the like. The various parts of the system may be sealed or locked to prevent unauthorized or malicious tampering with them; and recorders and other well known devices may be used in connection with the system to check up the care and vigilance used by the engineer. In short, various additions and modifications, obvious to those skilled in the art, may be made in the particular construction shown and described, without departing from my invention, and I desire to have it understood that the specific constructions and arrangements of parts and circuits shown and described, are merely illustrative of my invention, and do not exhaust the various modifications of the idea of means constituting my invention.

What I claim as new and desire to secure by Letters Patent of the United States is:—

1. In an automatic train control system, automatic brake control apparatus on a vehicle comprising, in combination with the usual engineer's brake valve, a pneumatic device and normally energized electrical control means therefor adapted whenever said control means is deenergized to exert a pressure which will move the brake valve to its brake applying position, and will maintain such pressure so long as said control means remains deenergized, the force exerted by said pneumatic device upon the engineer's brake valve being sufficient to assure movement thereof but small enough to permit the engineer to forcibly prevent such movement, and automatic means for reenergizing said control means only after a time at least long enough to assure a brake application.

2. In an automatic train control system, the combination with the usual engineer's brake valve of an air-brake system, automatic operating means for said brake valve controllable from the trackway and acting when operated to exert a force to move the brake valve to the service brake applying position, said means exerting a force sufficient to assure movement of the brake valve but weak enough to permit the engineer to forcibly prevent such movement, and automatic means set into operation concurrently with the initiation of said operating means for removing such force after the lapse of a predetermined interval of time.

3. In an automatic train control system, brake applying mechanism for railway vehicles and cooperating with the regular air-brake equipment comprising, in combination with the usual engineer's brake valve, a fluid pressure device adapted when operated to exert a force to move said brake valve to the service brake applying position, control means adapted to be governed from the trackway automatically for initiating the operation of said device, and automatic means on the vehicle having its operation initiated concurrently with the change of the control means to operate said device for removing the force exerted by said device after an interval of time following such change of the control means.

4. In an automatic train control system, automatic brake controlling apparatus operable to exert a continuing tendency to cause an automatic application of the brakes, said apparatus including means permitting the engineer to prevent such automatic application, and time-responsive means for restoring said apparatus after the lapse of different intervals of time depending upon whether such automatic application of the brakes is held off or permitted.

5. In an automatic train control system, impulse transmitting means comprising a car-carried element including a magnetic yoke and coils, a circuit and a source of direct current for energizing said coils, an electro-responsive device included in said circuit and operable upon either an increase or decrease in the current normally flowing therein, and a trackway element controlled in accordance with traffic conditions in advance and adapted to influence a rapid change in flux through said coils during the passage of the vehicle thereby when dangerous traffic conditions exist.

6. In an automatic train control system, a car-carried element for electro-magnetic impulse transmitting means comprising a yoke, a field coil and a secondary coil on said yoke, a circuit including a source of current and a check relay for energizing said field coil, electro-responsive means connected in circuit with said secondary coil, and automatic train control apparatus governed jointly by said check relay and said electro-responsive means.

7. In an impulse transmitting means for automatic train control systems, a car-carried element comprising a yoke constituting a partial magnetic circuit, a coil on said yoke, and a source of current and an electro-responsive device connected in circuit with said coil, said electro-responsive device being operated upon either an increase or a decrease in the normal current.

8. In electro-magnetic impulse transmitting means for automatic train control systems, a car-carried element comprising a magnetic yoke having a field coil and a secondary coil thereon, a circuit including a source of direct current for energizing the field coil, an electro-responsive device in circuit with the secondary coil, a trackway element comprising a magnetic yoke and coils thereon arranged to cooperate with the car-carried element, and means for putting the coils of said trackway element in a deenergized closed-circuit.

9. In electro-magnetic impulse transmitting means for automatic train control systems, a car-carried element comprising a U-shaped magnetic yoke, oppositely wound coils on the legs of said yoke, a circuit including a source of direct current for energizing said coils, an electro-responsive device included in said circuit, and traffic controlled means along the track for causing a rapid change in the reluctance of the partial magnetic circuit of said car-carried yoke when dangerous traffic conditions exist.

10. In an automatic train control system, impulse transmitting means including a car-carried element having a coil, a circuit for said coil including a source of current of variable voltage, electro-responsive means included in said circuit and operable upon a predetermined decrease in the current normally flowing therein, and means for regulating the resistance of said circuit to maintain said normal current, whereby said electro-responsive means may be maintained in its normal operating condition regardless of voltage variations of the source of current.

11. In an automatic train control system, a relay for responding to the momentary currents induced in the car-carried coils of an electro-magnetic impulse transmitting means, said relay comprising; a winding and a cooperating armature, circuit controlling means operable upon movement of said armature in either direction from a middle balanced position, and adustable biasing means for balancing said armature in its middle position when a predetermined current flows through the winding of the relay.

12. In an automatic train control system, the combination with a car-carried impulse device adapted to be influenced by magnetic bodies on the track, of short-circuited coils associated with track rails and other foreign magnetic bodies on the track for preventing the car-carried element being improperly influenced by such foreign bodies.

13. In a system of train control in which control influences are produced inductively by the co-operation of car-carried means and trackway means, train control means on the car including an electro-responsive device for governing the brakes of the car, a control relay having normally closed contacts and governing said train control means, means on the car for governing said relay, said means being adapted to be influenced from the trackway and including a circuit comprising in series, a source of current, said electro-responsive device and a flux producing coil energized sufficiently to cause a control influence to be transmitted, said electro-responsive device having a predetermined dropaway characteristic and acting to cause control of the train when the current in said circuit falls below a critical value.

14. In a system of train control in which controlling influences are transmitted inductively between car-carried means and trackway means, a control relay having normally closed contacts, means on the car for governing said relay, said means being adapted to be influenced from the trackway and including a circuit comprising in series, a flux producing coil normally energized to an extent sufficiently to affect the transmission of a control influence, a source of energy, and a device adapted to cause an application of the brakes when said source of energy fails to sufficiently energize said flux producing coil.

15. In a train control system, brake applying mechanism for railway vehicles operated by a change in fluid pressure and adapted to cause an automatic brake application, an electrically governable control device including a normally energized winding for initiating the operation of said mechanism and adapted when said winding is deenergized to assume its active controlling condition and to remain in that condition until restored, and time-controlled means set into operation by said control device concurrently with the initiation of the operation of said brake applying mechanism, for restoring the control device after the lapse of a predetermined time.

16. In an automatic train control system, the combination with the usual engineer's brake valve, of fluid pressure operated means adapted to move said brake valve to a brake applying position, a normally energized electro-pneumatic valve controlling the application of fluid pressure to said means, said electro-pneumatic valve if once deenergized remaining open until restored, a normally closed energizing circuit for said electro-pneumatic valve, a normally open circuit adapted if closed to reclose said valve, manually operable means controlling said normally open circuit, and traffic controlled means partly on the vehicle and partly on the track for temporarily interrupting said normally closed energizing circuit for said electro-pneumatic valve under dangerous traffic conditions but not under safe traffic conditions.

17. In an automatic train control system, the combination with an engineer's brake valve, of fluid pressure means adapted to move the brake valve to a brake applying position, a normally energized electro-pneumatic valve controlling the application of fluid pressure to said means, said electro-pneumatic valve when de-energized remaining de-energized until restored, a restoring circuit for said valve, and time responsive means having its operation initiated when the electro-pneumatic valve is operated for closing said circuit.

18. In an automatic train control system, the combination with an engineer's brake valve, of a fluid pressure device for automatically shifting said valve to a brake applying position, an electro-pneumatic valve for controlling the application of pressure to said device, said valve when operated continuing in operation until restored, a restoring circuit for said valve, time responsive means set into operation when said valve is operated for closing the restoring circuit at one point, and manually operable means disposed in position to be operable by a person other than the engineer when he is at his post for closing the restoring circuit at another point.

19. In an automatic train control system, automatic means having a predetermined limited time of effective operation and tending when set into operation to cause an automatic brake application, said means being controllable by the engineer manually to prevent such brake application, an engineer's brake valve, and automatic means acting when the engineer's brake valve is moved to a brake applying position for shortening said time interval.

20. In an automatic train control system, in combination with an engineer's brake valve, pressure means operatively connected with said valve and adapted when operated to move the valve to a brake applying position, a normally energized electro-pneumatic valve controlling said means, said valve if once deenergized continuing to be effective to operate said pressure means until restored, automatic means for restoring said electro pneumatic valve to render said pressure means inactive, a normally energized relay governing said valve, a car-carried impulse receiving element for governing the relay and comprising a magnetic core, and trackway means for causing a change of flux through said core.

21. In an automatic train control system, in combination with an engineer's brake valve, of fluid pressure means adapted when operated to cause movement of said valve, the force produced by said means being such that the engineer may prevent such movement, a normally energized electro-pneumatic valve adapted when de-energized to govern the supply of pressure to said means, a normally energized relay on the vehicle controlling said valve, said valve if once operated continuing in its active condition independently of the relay until restored, automatic means for restoring said valve, and means comprising co-operating elements on the vehicle and on the track and operating by the transfer of magnetic flux through an intervening air gap for causing momentary de-energization of the relay.

22. In an automatic train control system, the combination with automatic brake control means on a vehicle having a tendency to change to its active condition and adapted when active to cause an automatic brake application, means manually controllable by the engineer for restoring said means after the lapse of a predetermined time, and co-operating vehicle-carried and trackway means acting through an intervening air gap for governing the operation of said brake control means in accordance with traffic conditions.

23. In an automatic train control system, the combination with a track element constituting an inert mass of iron when in the active stopping condition, of car-carried means adapted to co-operate with said track element and comprising a source of magneto-motive-force, a coil in magnetic circuit with said source in which current is induced by a change of reluctance of said magnetic circuit, and a normally energized electro-responsive means governed by current changes in said coil.

24. In an automatic train control system, the combination with a track element providing a partial magnetic circuit on the trackway when in the active stopping condition, of a car-carried yoke adapted to co-operate with said track element, a normally energized coil on said yoke constituting a source of uni-directional magneto-motive force for producing flux in said yoke, a secondary coil magnetically associated with said yoke, a source of direct current, and electro-responsive means connected in circuit with the secondary coil and the source of current, and operated by a current change in said secondary coil.

25. In an automatic train control system, means for transferring controlling influences from a trackway to moving vehicles comprising, a track element having an iron core and a winding magnetically associated with said core, traffic controlled means for including said winding in a de-energized closed circuit of low resistance under clear traffic conditions and for opening such circuit under dangerous traffic conditions, a vehicle-carried element adapted to co-operate with said track element and comprising a source of magneto-motive-force, a coil magnetically coupled with said source, an electro-responsive device, a battery, and a circuit including in series said coil, battery and electro-responsive device.

26. In an automatic train control system, means for transferring controlling influences from a trackway to moving vehicles comprising, a track element having an iron core and a winding magnetically associated with said core, traffic controlled means for including said winding in a de-energized closed circuit of low resistance under clear traffic conditions and for opening such circuit under dangerous traffic conditions, a vehicle-carried element adapted to co-operate with said track element and comprising a U-shaped magnetic yoke, a field coil and a secondary coil on said yoke, circuits and sources of current for energizing said coils, a normally energized electro-responsive device in each circuit, and automatic train control means on the vehicle responsive to either of said electro-responsive devices.

27. Car equipment for automatic train control systems, comprising a magnetic core, a field coil and a secondary coil on said core, separate circuits each including a source of current for energizing said coils, a relay in each circuit, and normally energized train control means governed by both of said relays.

28. In an automatic train control system for railroads having tracks divided into blocks each provided with a normally closed track circuit, traffic over the railroad being normally in one direction, a track element at the entrance to each block having a control circuit and adapted to be rendered inactive when said circuit is closed, means controlled by the track circuit of the block next in advance of the corresponding block for closing the circuit of said track element, and a receiving element carried on one side of the car and co-operating magnetically with said track element through an intervening air gap, all of the track elements being disposed on one side of the center line of the track so that they do not co-operate with the car-carried element when the car travels head on opposite to the normal direction of traffic.

29. A system of train control in which the controlling impulses are produced inductively by the cooperation of car-carried means and trackway means, impulse receiving means on the car comprising a primary coil and having its safe operation dependent upon energization of said coil, a secondary coil adapted to receive control influences from said trackway means to control the train, an energizing circuit for said primary coil, and electro-responsive means included in said circuit in series with the primary coil for automatically retarding the car when current ceases to flow in said circuit.

30. In a system of train control in which controlling impulses are transmitted from the track to trains inductively by the cooperation of car-carried means and trackway means, a normally energized control relay on a car adapted when deenergized to cause automatic retardation of the car, impulse receiving means on the car influenced from the track for governing said relay, said means including a normally energized coil for producing flux to produce such controlling influence, an energizing circuit for said coil, and an electro-responsive device operable upon a predetermined decrease in the normal current flowing therein to retard the car, said device being included in said energizing circuit.

31. In a train control system, car and track equipment cooperating to communicate control influences from the trackway to the moving car inductively through an intervening air gap and comprising, the combination with a car element having a magnetic core, separate spaced field and secondary coils on said core, a source of direct current on the car constantly energizing said field coil to produce uni-directional flux in said core, normally energized electro-responsive means on the car connected to said secondary coil and effectively de-energized by voltage induced in said secondary coil by variations in said flux in said core; of a track element acting under dangerous traffic conditions to change the reluctance of the magnetic circuit of said core and cause more of the flux created by the field coil to link the secondary coil during movement of said car element over said track element.

32. In a train control system, car and track equipment cooperating to communicate control influences from the trackway to the moving car inductively through an intervening air gap and comprising, the combination with a car-carried receiving element having a magnetic core with spaced legs, a field coil on one leg of the core, a secondary coil on the other leg of the core, a source of current constantly energizing the field coil, a normally energized relay on the car electrically connected to the secondary coil; of a track element having a non-magnetized iron core disposed to come in superimposed relation to the core of the car receiving element and complete the partial magnetic circuit through said core of the receiving element, a winding on the core of the track element, and a deenergized circuit of low resistance including said winding and closed only under safe traffic conditions.

33. In a train control system, car and track equipment cooperating to communicate control influences from the trackway to the moving car inductively through an intervening air gap and comprising, the combination with a track element having a magnetic core, a winding on said core, a deenergized circuit including the winding and closed only under safe traffic conditions; of a car-carried receiving element having a magnetic core, separate field and secondary coils on said core of the receiving element and both normally energized, electro-responsive means on the car controlled by a change in current in said secondary coil and momentarily operated during movement of the car element over the track element when the winding of the latter is on open circuit, said electro-responsive means if once operated continuing in operation until restored, and means for restoring said electro-responsive means.

34. In a system of train control, a car-carried core of magnetic material having two spaced legs, a constantly energized field coil on one leg of said core, a secondary coil on the other leg of said core, a normally energized electro-responsive device on the car connected to said secondary coil, and trackway means acting automatically through an intervening air gap under dangerous traffic conditions to vary the amount of flux derived from the field coil which links said secondary coil, whereby a cycle of voltage is induced in said secondary coil temporarily during increase and decrease of flux through the secondary coil, part of said cycle acting to reduce the amount of current normally supplied to said electro-responsive device and thereby cause temporary operation thereof.

35. In a system for inductively communicating control influences from the trackway to railway vehicles, the combination with a car element having a partial magnetic circuit, a constantly acting source of magneto-motive-force tending to send flux through said circuit, a secondary coil associated with said car element and magnetically coupled with said circuit, the flux derived from said source of magneto-motive-force passing in part through leakage paths, a normally energized electro-responsive device on the car connected to the secondary coil and having its energizing current varied by voltage changes occurring in said secondary coil due to variations in the amount of flux linking said coil; of trackway means disposed to complete the partial magnetic circuit of the car element with an intervening air gap and always tending to cause more flux from the source of magneto-motive-force to link the secondary coil during movement of the car element by said trackway means, and means associated with said trackway means for rendering it ineffective under safe traffic conditions.

36. An automatic train control system comprising, a brake setting appliance on a car operable to act upon the regular air brake equipment and cause an automatic application of the brakes, a normally energized electro-pneumatic valve acting if deenergized to cause operation of said appliance, a normally energized relay on the car governing said electro-pneumatic valve, said electro-pneumatic valve if once operated continuing in operation until restored, manually controlled means on the car for restoring said electro-pneumatic valve, an impulse receiving element on the car having a magnetic core and separate field and secondary coils thereon both normally energized with uni-directional current, a track element having a magnetic core arranged to come into superimposed relation to the core of said receiving element during movement of the car thereby, a winding on the core of the track element, and a deenergized circuit including said winding and closed only under safe traffic conditions, said relay on the car being connected to the secondary coil of the car-carried receiving element and being normally operated by movement of the receiving element over the track element when the latter has its winding on open circuit.

37. Car apparatus for train control systems comprising an automatic brake setting appliance, a normally energized electro-pneumatic valve controlling said appliance, a normally open energizing circuit for said electro-pneumatic valve, and fluid pressure operated circuit controlling means including a cylinder and a restricted supply orifice therefor for closing a break in said circuit, said circuit controlling means having its operation dependent upon the position of the usual engineer's brake valve forming part of the car air-brake equipment.

38. In an automatic train control system, the combination with a track device constituting a non-magnetized partial magnetic circuit when in the active stopping condition, of a car element cooperating therewith comprising a U-shaped magnetic core, a constantly energized field coil on said core constituting a source of magneto-motive-force for producing uni-directional flux in said core, a secondary coil on said core in which voltage is induced by the change in flux from the field coil which change is produced by the variation of the reluctance of the partial magnetic circuit through said core as it moves over said track device, and normally energized electro responsive means on the car deenergized by the voltage induced in said secondary coil.

39. In a train control system, the combination with a track element constituting an inert mass of iron when in the active stopping condition, a car element cooperating with the track element and comprising means constituting a partial magnetic circuit having its reluctance varied during its passage over said track element, a field coil for said car element energized by direct current and producing flux in the partial magnetic circuit of said element, a secondary coil magnetically associated with said partial magnetic circuit and having voltage induced therein upon change of flux in said partial magnetic circuit, and an electro-responsive device and a source of direct current connected in series with the secondary coil.

40. In a system for communicating control influences to railway vehicles from the trackway through an intervening air gap, the combination with a car element comprising a core constituting a partial magnetic circuit, a field coil on the core constantly energized by direct current, a secondary coil on the core in which voltage is induced by a change in the flux from said field coil which change is produced by variation in the reluctance of the magnetic circuit including said core, a normally energized relay connected to said secondary coil and having its energizing current decreased by the voltage induced in said secondary coil, and trackway means including a deenergized circuit for varying the reluctance of the car carried partial magnetic circuit if said circuit of the trackway means is open.

41. In a system for communicating control influences to railway vehicles from the trackway through an intervening air gap, the combination with a track element having a deenergized control circuit, said element assuming its active condition if said control circuit is open and being inactive if said circuit is closed, a car carried device cooperating with said track element and comprising a constantly acting source of magneto-motive-force, a coil in magnetic circuit with said source and having voltage induced therein during movement of the car device over the track element in its active condition, electro-responsive means actuated by a decrease in its energizing current, and a circuit constantly energized by direct current and including said coil and electro-responsive means in series.

42. In a system of train control, the combination with a track element comprising a U-shaped magnetic core, a winding on said core, and a deenergized circuit of low resistance including said winding and closed only under clear traffic conditions, of a car element having a U-shaped magnetic yoke arranged to come directly over the core of the track element as the car passes it, separate field and secondary coils on said yoke each constantly energized by direct current, an electro-responsive device rendered active by a decrease in its energizing current, and included in circuit in series with said secondary coil, and train control mechanism having its operation initiated by said electro-responsive device.

43. In a system of train control, the combination with a track element comprising a U-shaped magnetic core, a winding on said core, and a deenergized circuit of low resistance including said winding and closed only under clear traffic conditions, of car equipment influenced by said track element through an intervening air gap and comprising, a partial magnetic circuit and a constantly acting source of uni-directional magneto-motive-force therefor, the movement of the car past said track element with its circuit open changing the reluctance of said partial magnetic circuit on the car and causing a change in flux therein, a normally energized circuit magnetically associated with said partial magnetic circuit and having the current therein decreased by such change in flux, and train control mechanism responding to such decrease in current in said normally energized circuit.

44. In a system for communicating control influences to railway vehicles from the trackway inductively, the combination with car apparatus comprising a U-shaped magnetic core having enlarged pole pieces, a field coil constantly energized by direct current and located on one leg of the core, a secondary coil on the other leg of the core, a relay, a battery, and a circuit including in series the secondary coil, relay and battery, and trackway means for varying the magnetic reluctance of said core.

45. In a system for communicating control influences to railway vehicles from the trackway inductively, the combination with a car carried core constituting a partial magnetic circuit and having a constantly energized field coil and secondary coil magnetically associated therewith, a battery and a relay connected in series circuit with the secondary coil, a track element comprising a core, a winding on the core, and a deenergized circuit of low resistance including said winding and closed only under clear traffic conditions.

46. In a system for communicating control influences to railway vehicles from the trackway inductively, cooperating car carried and trackway U-shaped magnetic cores having substantially the same spacing between their ends and arranged to come in super-imposed relation during the movement of the car past the control point, constantly energized field and secondary coils on the car carried core, and a deenergized coil on the trackway core included in a circuit of low resistance only under clear traffic conditions.

47. In a system for communicating control influences to railway vehicles from the trackway inductively, the combination with a car-carried core constituting a partial magnetic circuit and having a constantly acting source of uni-directional magneto-motive-force tending to send flux through said magnetic circuit, a normally energized circuit in which voltage is induced upon change in the flux through the partial magnetic circuit, of a track device constituting an inert non-magnetized mass of iron for varying the reluctance of the car-carried partial magnetic circuit, and a deenergized circuit acting if closed to render said track device ineffective.

48. In a train control system, the combination with brake control apparatus, normally energized electro-responsive means initiating operation of said apparatus upon decrease of the current therein, a secondary coil, a circuit including the secondary coil and the electro-responsive means in series, and means comprising a car-carried source of magneto-motive-force producing unidirectional flux and an inert mass of iron on the trackway for inducing voltage in said secondary coil and thereby causing decrease in the energizing current of said electro-responsive means.

49. In a train control system, a brake control apparatus, a normally energized relay controlling the initiation of the operation of said apparatus, an energizing circuit for said relay including a battery, means partly on the car and partly on the track and cooperating through an intervening air gap for producing voltage in said energizing circuit opposing that of said battery, said means comprising a source of uni-directional magneto-motive-force on the car, and a track device constituting an inert non-magnetized mass of iron while in the active stopping condition.

50. In a system of train control, the combination with a car-carried source of energy, a partial magnetic circuit on the car constantly magnetized with uni-directional flux, electro-responsive means energized from said source and actuated by a change of flux in the magnetic circuit, and trackway means comprising a magnetic core and a deenergized control circuit of low resistance closed only under safe traffic conditions for causing flux changes in said magnetic circuit provided said control circuit is open.

51. In a system of impulse communication of the inductive type described, a car-carried impulse receiving element having a U-shaped magnetic yoke, separate field and secondary coils on said yoke both constantly energized by direct current, and impulse detecting means operated by a decrease in the normal current through either of said coils.

52. In a train control system, the combination with a vehicle and a trackway therefor divided into blocks, a track element near the entrance to each block comprising a U-shaped magnetic core, a winding on said core, a circuit including said winding and opened and closed respectively if the next block in advance is occupied or unoccupied, car apparatus influenced by said track device when its circuit is open, said car apparatus comprising, brake control mechanism operable to cause an automatic brake application and continuing in operation until restored, normally energized electro-responsive means governing said mechanism, receiving means including a partial magnetic circuit and responding to a change of flux in that circuit for deenergizing said electro-responsive means, said track element cooperating with the receiving means to produce such change in flux if the control circuit for the track element is open, and automatic means for restoring said mechanism after operation thereof.

53. Inductive influence communicating means for train control systems comprising, a car-carried source of direct current, a relay and a normally closed circuit therefor on the car energized from said source, means on the car affected by a non-magnetized partial magnetic circuit on the trackway for producing a voltage in said relay circuit opposing that of said source, a track device constituting such a partial magnetic circuit when in the active stopping condition, and means including a deenergized circuit for rendering said track device ineffective upon closure of said circuit.

54. Inductive influence communicating means for train control systems comprising, a car-carried relay, a circuit having a battery therein for normally energizing said relay, means partly on the car and partly on the track including a source of uni-directional flux on the car separate from said circuit for producing voltage in said circuit opposing that of the battery and thereby causing deenergization of the relay provided danger conditions exist.

55. Inductive influence communicating means for train control systems comprising, a car element comprising a magnetic core constituting a partial magnetic circuit, a constantly energized field coil on said core, a secondary coil on the core, a circuit including a relay and a battery connected in series with said secondary coil, a track element having a non-magnetized core cooperating with the core of the track element to induce voltage in the secondary coil opposing that of the battery, and a circuit opened under danger traffic conditions and closed under safe traffic conditions for producing opposition to the passage of flux from the car element through the core of the track element while said circuit is closed.

56. Inductive influence communicating means for train control systems comprising, a track device constituting a non-magnetized body while in the active stopping condition and resisting the passage of flux through it under safe traffic conditions, car-carried means cooperating with said track element and comprising a normally energized circuit, and a source of uni-directional magneto-motive-force separate from said circuit and magnetically associated therewith.

57. Car-carried impulse receiving means comprising, a U-shaped magnetic core, a field coil on one leg of said core constantly energized by direct current, a secondary coil on the other leg of the core, a relay, a battery, and a circuit connecting said relay, battery and secondary coil in series.

58. Car-carried impulse receiving means comprising, a core constituting a partial magnetic circuit, a field coil on said core constantly energized by direct current, a separate secondary coil on said core, a relay, a source of current, a closed circuit including said relay, source of current and secondary coil in series, and normally energized electro-responsive means connected in series with the field coil and operable by a decrease of current therein.

59. A train control system of the character described characterized by the communication of control influences from the trackway to the moving vehicle inductively through an intervening air gap by the cooperation of car-carried means, including a source of uni-directional magneto-motive-force and a separate receiving circuit, with a track device which is non-magnetized while in the active stopping condition, said car-carried means comprising a co-acting chain of normally energized devices and circuits effective to produce a stopping influence in the event of failure of said source of magneto-motive-force or interruption of any of said circuits.

60. In a train control system, car equipment comprising, the combination with an electrically controllable fluid pressure device for causing an automatic brake application whenever deenergized, said device when operated continuing in operation until restored, manually operable means non-accessible by the engineer while at his post, and automatic means cooperating with said manually operable means to cause restoration of said device.

61. In a train control system, car equipment comprising, the combination with a brake setting means continuing in operation until restored, normally inactive control means therefor adapted to be rendered active to initiate operation of the brake setting means by influences from the trackway, a normally open circuit adapted when closed to cause restoration of said brake setting means, means governed by said control means for closing said circuit at one point after an interval of time following a change of the control means to its active condition, and manually operable means for closing said circuit at another point.

62. In a train control system, car equipment comprising, electrically controllable brake setting means on a vehicle operated by a change in fluid pressure and acting when operated to produce an automatic application of the air brakes, a normally energized electro-responsive device on the vehicle active when deenergized to initiate operation of said means, and means effective only after the lapse of a predetermined time following the initiation of the operation of said brake applying means for determining restoration thereof.

63. Brake control equipment for railway vehicles comprising, the combination with an engineer's brake valve, brake applying means including said brake valve, control means momentarily influenced from the trackway for initiating operation of said brake applying means, and automatically remaining active until restored, and means dependent upon the movement of said brake valve for determining restoration of said control means.

64. Brake equipment for railway vehicles acting upon the regular air-brake equipment and comprising, in combination with an engineer's brake valve, a cylinder and piston for moving said valve upon change of fluid pressure in the cylinder, means including a normally energized circuit for governing the pressure change in said cylinder upon interruption thereof, said means if once effective continuing in that state until restored, a restoring circuit for said means, and circuit controlling means responsive to pressure changes in the cylinder for closing a break in said restoring circuit.

65. In a train control system, brake applying apparatus for railway vehicles comprising, means including an engineer's brake valve for producing an automatic application of the air brakes upon movement of said valve, fluid pressure operated means for moving said valve and adapted whenever rendered effective to continue to be effective until restored, control means including a normally energized circuit for governing the operation of said fluid pressure means, trackway and car-carried devices cooperating with an intervening air gap for momentarily interrupting said circuit, and automatic means for restoring said fluid pressure operated means.

66. In a train control system, the combination with a car-carried brake setting means acting upon the regular air-brake equipment and continuing in operation until restored, automatic restoring means therefor, of car-carried and track devices cooperating through an intervening air gap for initiating operation of said brake-setting means, said track device constituting an inert mass of iron when in the active stopping condition.

67. In a train control system, the combination with a car-carried brake setting means acting upon the regular air-brake equipment and continuing in operation until restored, automatic restoring means therefor, a normally energized electro-responsive device on the car, car-carried receiving means, and a track device cooperating with said receiving means to cause deenergization of the electro-responsive device, said track device having a non-magnetized core and a winding thereon which is included in a deenergized circuit of low resistance only under safe traffic conditions.

68. In a train control system, the combination with brake setting apparatus on a vehicle including the usual engineer's brake valve, said apparatus when once set into operation continuing in operation until restored, automatic means for restoring said apparatus, control means for said apparatus operable upon the interruption of a normally energized circuit, and car-carried and trackway devices tending to cooperate through an intervening air gap and cause interruption of said circuit, said trackway devices each having a control circuit which avoids such interruption of the car circuit if that control circuit is closed.

69. In a system of the character described, brake-setting apparatus adapted to be set into operation from the trackway and continuing in operation until restored, an engineer's brake valve, and automatic means effective upon movement of the engineer's brake valve to a brake applying position for restoring said apparatus after a limited time.

70. In a train control system, brake-setting apparatus on a vehicle having its operation manually preventable by the engineer and adapted if operated to produce an automatic application of the air brakes, said apparatus when once rendered effective continuing in that state until restored, car-carried and trackway devices cooperating through an intervening air gap for determining the initiation of the operation of said apparatus, a normally open restoring circuit for said apparatus, and automatic means for closing said restoring circuit.

71. In a system for governing the movement of railway vehicles, the combination with means for producing a momentary control influence on the vehicle from the trackway, control means rendered effective continuously until restored by such momentary influence, and automatic means for restoring said control means after a predetermined time if the engineer manually applies the brakes by moving his brake valve to the service position.

72. In a device for controlling railway trains, the combination with a control mechanism including a winding, of a constantly excited train-carried electromagnet; an inductive impulse winding thereon; a circuit including said impulse winding and said winding of the control mechanism, the maintenance of said control mechanism in normal condition being dependent on the maintenance of said circuit; a track-mounted electro-magnet serving, according to its condition of excitation at the moment of passage of the train-carried electromagnet, to change or leave unchanged the reluctance of the magnetic circuit of the train-carried electromagnet; and controllable means for changing the excitation of the track-mounted electromagnet.

73. In a device for controlling railway trains, the combination with a control mechanism including a winding, of a constantly excited train-carried electromagnet; an inductive impulse winding thereon; a circuit including said impulse winding and said winding of the control mechanism, the maintenance of said control mechanism in normal condition being dependent on the maintenance of said circuit; a track-mounted electromagnet serving when deenergized to reduce the reluctance of the magnetic circuit of the train-carried electromagnet at the moment of passage of said electromagnet, and when excited to have substantially no effect thereon; and controllable means for exciting and deenergizing said track-mounted electromagnet.

74. In a device for controlling railway trains, the combination with a control mechanism including a winding, of a train-carried electromagnet constantly excited by direct current; an inductive impulse winding thereon; a circuit including said impulse winding and said winding of the control mechanism, the maintenance of said control mechanism in normal condition being dependent on the maintenance of said circuit; a track-mounted armature; a winding on said armature; and a switch serving to control a circuit through said last named winding.

75. In a device for controlling railway trains, the combination with a control mechanism of a constantly excited train-carried electromagnet; an inductive impulse winding thereon connected in circuit with said control mechanism and normally weakly excited to oppose the constant excitation of said electromagnet; a track mounted armature; a winding on said armature; and a switch serving to control a circuit through said last named winding.

76. In a device for controlling railway trains, the combination with a control mechanism of an electromagnet mounted on the train and including a core and an exciting winding thereon, said winding being in circuit with a source of electric current; a relay switch serving to operate said control mechanism; a secondary winding on said core; a circuit including said secondary winding and the winding of said relay switch, the maintenance of said circuit being essential to the maintenance of said relay in normal condition; an armature on the track in position to reduce the reluctance of the magnetic circuit through the core of said electromagnet when the core passes the armature in the movement of the train; a winding on said armature; and a switch serving to control a circuit through said last named winding.

77. In a device for controlling railway trains, the combination with a control mechanism of an electromagnet mounted on the train and including a core and an exciting winding thereon, said winding being in circuit with a source of electric current; a relay switch serving to operate said control mechanism; a secondary winding on said core; a circuit including said secondary winding and the winding of said relay switch, the maintenance of said circuit being essential to the maintenance of said relay in normal position; an armature on the track in position to reduce the reluctance of the magnetic circuit through the core of said electromagnet when the core passes the armature in the movement of the train; a winding on said armature; and a current source and controlling switch in circuit with said armature winding, and serving when said switch is closed to excite said armature winding in opposition to the excitation of said electromagnet.

78. In a device for controlling railway trains, the combination with a control mechanism of an electromagnet mounted on the train and including a core and an exciting winding thereon, said winding being in circuit with a source of electric current; a relay switch serving to actuate said control mechanisms; a secondary winding on said core; a source of relatively weak electric current in circuit with said secondary winding and with the winding of said relay switch, and serving to hold said relay switch in normal condition and to excite said secondary winding to oppose weakly the exciting winding of said electromagnet; an armature on the track in position to reduce the reluctance of the magnetic circuit through the core of said electromagnet, when the core passes the armature in the movement of the train; a winding on said armature; and a current source and controlling switch in circuit with said armature winding, and serving, when said switch is closed, to excite said armature in opposition to the excitation of said electromagnet.

79. An apparatus of the character described including a movably mounted differential inductive device energized by different direct current circuits, translating means controlled by current flowing in one circuit, and means adjacent to the path of movement of said device and with which said device is inductively cooperable to affect the current in said circuit and control said means.

80. In a device for controlling railway trains, the combination with a control mechanism including a winding, of a train carried electromagnet constantly excited by direct current; an inductive impulse winding thereon; a circuit including said impulse winding and said winding of the control mechanism, the maintenance of said control mechanism in normal condition being dependent on the maintenance of said circuit; and track mounted inductive means to affect said electromagnet.

81. In a device for controlling railway trains, the combination with a control mechanism, of a constantly excited train carried electromagnet; an inductive impulse winding thereon connected in circuit with said control mechanism and normally weakly excited to oppose the constant excitation of said electromagnet; and track mounted inductive means to affect said electromagnet.

82. In a device for controlling railway trains, the combination with a control mechanism, of an electromagnet mounted on the train and including a core and an exciting winding thereon, said winding being in circuit with a source of electric current; a relay switch serving to actuate said control mechanism; a secondary winding on the core; a source of relatively weak electric current in circuit with said secondary winding and with the winding of said relay switch, and serving to hold said relay switch in normal condition and to excite said secondary winding to oppose weakly the exciting winding of said electromagnet; and an inductive means on the track to affect the electromagnet.

83. A device to be affected when passing an armature, including a control mechanism, a constantly excited electromagnet whose magnetic flux is affected when passing an armature, and an inductive impulse winding on said electromagnet connected in circuit with the control mechanism and normally weakly excited to oppose the constant excitation of said electromagnet.

84. In a device for controlling railway trains, the combination with a control mechanism, of a train carried core formed to define a magnetic circuit including a long air gap; a primary electric circuit including an exciting winding on said core, the winding of a relay switch, and a source of comparatively heavy current; a secondary electric circuit including an impulse winding on said core, the winding of a second relay switch, and a comparatively weak source of current, said impulse winding weakly opposing the exciting winding; the control mechanism being under the control of said relay switches whereby the actuation of either relay switch results in the actuation of said control mechanism; and a track mounted armature serving as the train carried core passes, to bridge the air gap of said core and to vary the reluctance of the magnetic circuit defined by said core.

85. A device to be affected when passing an armature, including a control mechanism, an electromagnet including a core and an exciting winding thereon; said winding being in circuit with a source of electric current, the reluctance of the magnetic circuit through the core being reduced when the core passes an armature, a relay switch serving to operate said control mechanism, a secondary winding on the core, and a circuit including said secondary winding and the winding of said relay switch, the maintenance of a predetermined energization of the relay switch winding being essential to the maintenance of said control mechanism in normal condition, and said secondary winding having such an inductive relation with the electromagnet to at least partially deenergize the relay switch winding when the magnetic flux of the electromagnet is affected when passing an armature.

WINTHROP K. HOWE.